United States Patent
Rochford et al.

(10) Patent No.: US 10,366,691 B2
(45) Date of Patent: Jul. 30, 2019

(54) SYSTEM AND METHOD FOR VOICE COMMAND CONTEXT

(71) Applicant: Samsung Electronics Co., Ltd, Suwon-si (KR)

(72) Inventors: Ciaran Rochford, Bellevue, WA (US); Philippe Harscoet, Bellevue, WA (US); Xiaoguang Li, San Jose, CA (US); Kinjal Bhavsar, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/876,073

(22) Filed: Jan. 19, 2018

(65) Prior Publication Data
US 2019/0019508 A1 Jan. 17, 2019

Related U.S. Application Data

(60) Provisional application No. 62/531,351, filed on Jul. 11, 2017.

(51) Int. Cl.
*G06F 3/01* (2006.01)
*G06F 3/16* (2006.01)
(Continued)

(52) U.S. Cl.
CPC .............. *G10L 15/22* (2013.01); *G06F 3/013* (2013.01); *G06F 3/167* (2013.01); *G10L 15/25* (2013.01);
(Continued)

(58) Field of Classification Search
CPC ... G10L 15/22; G10L 15/25; G10L 2015/223; G10L 2015/228; G10L 2015/227; G06F 3/013; G06F 3/167
See application file for complete search history.

(56) References Cited

U.S. PATENT DOCUMENTS

| 5,751,260 A | 5/1998 | Nappi et al. |
| 6,847,336 B1 | 1/2005 | Lemelson et al. |

(Continued)

FOREIGN PATENT DOCUMENTS

| CN | 102324035 A | 1/2012 |
| CN | 105355196 A | 2/2016 |

(Continued)

OTHER PUBLICATIONS

ISA/KR, International Search Report and Written Opinion of the International Searching Authority for International Application No. PCT/KR2018/007790, dated Oct. 10, 2018, 11 pages.

*Primary Examiner* — Mohammad K Islam

(57) ABSTRACT

A method, electronic device, and non-transitory computer readable medium for a mobile wallet remittance are provided. The method includes displaying, on a display, content including an object. The method also includes determining an area of an eye focus on the display, and associating the area of the eye focus with the object. The method additionally includes receiving a verbal command and deriving a command based on a detected set of lip movements. The method also includes extracting contextual information from at least one of the object associated with the eye focus, the received verbal command, or the derived command. The method also includes determining an intended command, based on the extracted contextual information and a reconciliation of the verbal command with the derived command. The method then performs the determined intended command

20 Claims, 9 Drawing Sheets

(51) Int. Cl.
  *G10L 15/22*     (2006.01)
  *G10L 15/25*     (2013.01)
(52) U.S. Cl.
  CPC .. *G10L 2015/223* (2013.01); *G10L 2015/227* (2013.01); *G10L 2015/228* (2013.01)

(56) References Cited

U.S. PATENT DOCUMENTS

| | | | |
|---|---|---|---|
| 9,323,325 B2* | 4/2016 | Perez | G02B 27/017 |
| 9,367,142 B2 | 6/2016 | Lee et al. | |
| 2008/0133244 A1 | 6/2008 | Bodin et al. | |
| 2008/0228496 A1* | 9/2008 | Yu | G06F 3/038 |
| | | | 704/275 |
| 2012/0154557 A1 | 6/2012 | Perez et al. | |
| 2013/0242262 A1 | 9/2013 | Lewis | |
| 2014/0337023 A1 | 11/2014 | McCulloch et al. | |
| 2015/0109191 A1 | 4/2015 | Johnson et al. | |
| 2015/0331673 A1* | 11/2015 | Mihalcea | G06F 8/20 |
| | | | 717/100 |
| 2015/0348550 A1 | 12/2015 | Zhang | |
| 2016/0091967 A1 | 3/2016 | Prokofieva et al. | |
| 2016/0203002 A1* | 7/2016 | Kannan | G06F 3/167 |
| | | | 715/708 |
| 2016/0255305 A1 | 9/2016 | Ritchey et al. | |
| 2017/0199543 A1 | 7/2017 | Rhee et al. | |
| 2017/0366857 A1* | 12/2017 | Sun | H04N 21/439 |
| 2017/0371184 A1* | 12/2017 | Shtukater | G02C 11/10 |
| 2018/0004286 A1* | 1/2018 | Chen | G02B 27/017 |
| 2018/0098059 A1* | 4/2018 | Valdivia | H04L 51/16 |
| 2018/0150204 A1* | 5/2018 | Macgillivray | G06F 3/012 |

FOREIGN PATENT DOCUMENTS

| | | |
|---|---|---|
| JP | 2004233909 A | 8/2004 |
| JP | 6016732 B2 | 10/2016 |
| KR | 10-2010-0062413 A | 6/2010 |
| KR | 10-1558262 B1 | 10/2015 |
| KR | 10-2016-0001465 A | 1/2016 |
| WO | 2014197226 A1 | 12/2014 |
| WO | WO2017036516 A1 | 3/2017 |

* cited by examiner

SYSTEM AND METHOD FOR VOICE COMMAND CONTEXT

CROSS-REFERENCE TO RELATED APPLICATION AND CLAIM OF PRIORITY

This application claims priority under 35 U.S.C. § 119(e) to U.S. Provisional Patent Application No. 62/531,351 filed on Jul. 11, 2017. The above-identified provisional patent application is hereby incorporated by reference in its entirety.

TECHNICAL FIELD

This disclosure relates generally to controlling an electronic device. More specifically, this disclosure relates to controlling an electronic device through a combination of voice recognition, lip reading, eye focus and contextual information.

BACKGROUND

Methods are interacting with and controlling a computing device are continually improving in order to conform more natural approaches. Computing devices, such as personal computers, smart phones, tablets, head mounted displays and the like, utilize graphical user interfaces (GUI) on a display screen to facility control by a user. Objects such as text, images, and video are displayed on a screen and the user can employ various instruments to control the computing device such as, a keyboard, a mouse, a touchpad. Many GUI can also include a touch sensitive screen whereby the GUI receives inputs when the user touches the display screen with a finger or a stylus. Additionally, computing devices can also provide for interaction via a voice input. Many such methods for interacting with and controlling a computing device generally require a user to physically touching the screen or utilizing an instrument such as a keyboard or mouse to provide a quick and precise input.

SUMMARY

This disclosure provides embodiments of a system and method for voice command context In a first embodiment, a method for controlling a head mounted display is provided. The method includes displaying, on a display, content including an object. The method also determines an area of an eye focus on the display, and associating the area of the eye focus with the object. The method further includes receiving a verbal command. The method also derives a command based on a detected set of lip movements. The method further includes extracting contextual information from at least one of the object associated with the eye focus, the received verbal command, or the derived command. The method also determines an intended command, based on the extracted contextual information and a reconciliation of the verbal command with the derived command. The method also performs the determined intended command In a second embodiment, an electronic device is provided. The at least one processor is coupled to a display, communication interface, and a memory and configured to display on the display, content including an object. The least one processor is also configured to determine an area of an eye focus on the display, and associating the area of the eye focus with the object. The least one processor is also configured to receive a verbal command and derive a command based on a detected set of lip movements. The least one processor is also configured to extract contextual information from at least one of the object associated with the eye focus, the received verbal command, or the derived command. The least one processor is also configured to determine an intended command, based on the extracted contextual information and a reconciliation of the verbal command with the derived command, and perform the determined intended command.

In a third embodiment a non-transitory computer readable medium embodying a computer program is provided. The computer program includes program code that when executed causes at least one processor to receive request to display on a display, content including an object; determine an area of an eye focus on the display, and associating the area of the eye focus with the object; receive a verbal command; derive a command based on a detected set of lip movements; extract contextual information from at least one of the object associated with the eye focus, the received verbal command, or the derived command; determine an intended command, based on the extracted contextual information and a reconciliation of the verbal command with the derived command; and perform the determined intended command.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
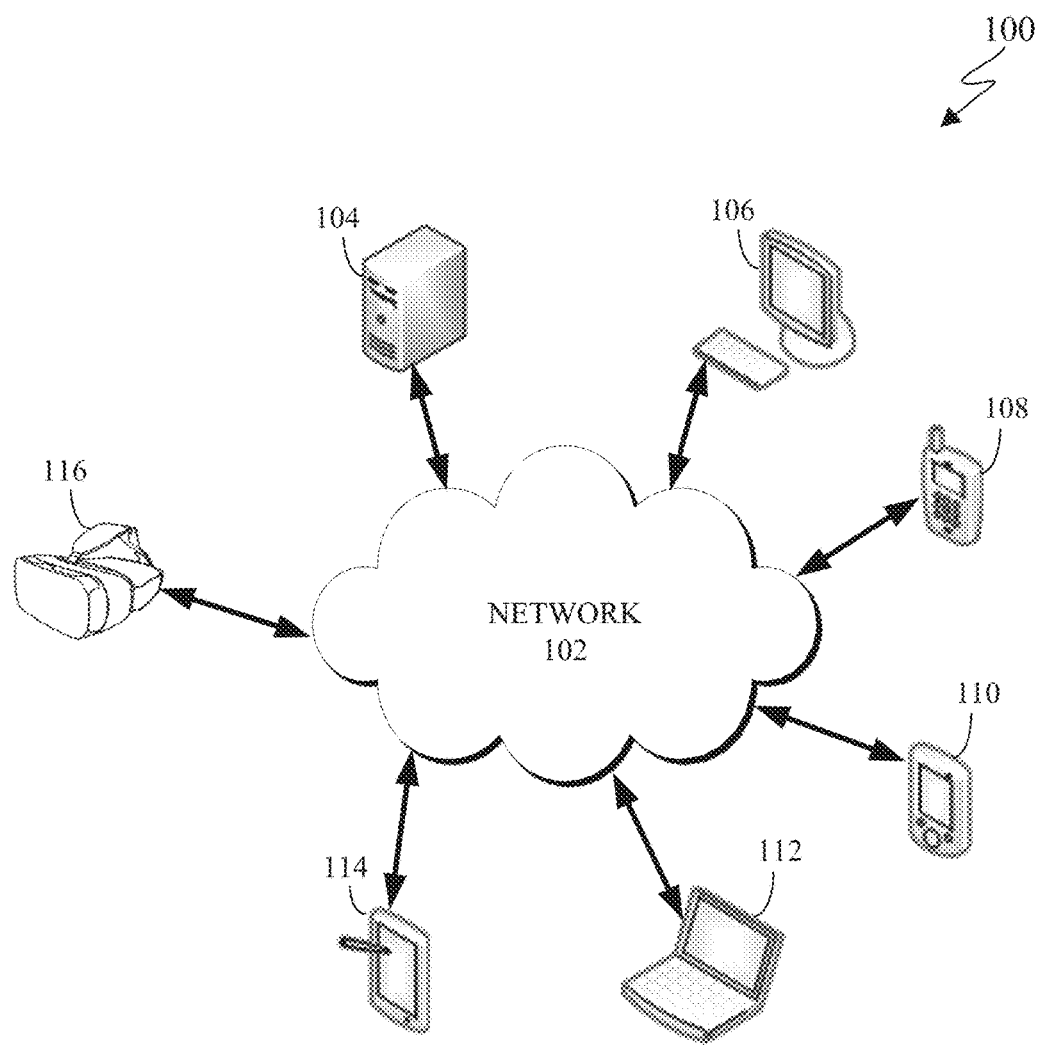
FIG. 1 illustrates an example communication system, in accordance with an embodiment of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

According to embodiments of the present disclosure, various methods for controlling and interacting with a computing device are provided. Graphical user interfaces allow a user interact with a computing device by enabling a user to locate and select objects on a screen. Common interactions include physical manipulations, such as, a user can physically move a mouse, type on a keyboard, touch a touch screen, to name a few. There are instances when utilizing various physical interaction such as touching a touchscreen are not feasible, such as when a user wears a head mounted display. For example, when the display screen is inside an enclosure and resting on the user's face near the user's eyes, the user is unable to touch the screen. Additionally, there are instances when utilizing an accessory device, such as a keyboard, mouse, touch pad, or remote, are cumbersome as the user is unable to see the device, or desires not to hold a remote. For example, a head mounted display can occlude the user's sight of the accessories preventing the user from accurately providing inputs to the electronic device. Similarly, if the user is watching a movie on a head mounted display, there are instances when a user the user desires not to hold a remote for the duration of the movie. Embodiments of the present disclosure also allow for additional approaches to interact with an electronic device.

According to embodiments of the present disclosure, contextual voice command is the process of utilizing supplementary approaches of controlling and interacting with an electronic device. Contextual voice command includes natural language processing associated with the eye focus of the user. Contextual voice command can also include lip reading to further improve the accuracy of the voice command.

Embodiments of the present disclosure utilize eye tracking, lip reading, or both to incorporate additional information in conjunction with natural language processing, such as voice recognition, to provide an improved and accurate understanding of a given voice command. Natural language processing recognizes words spoken by a user, and relates the spoken words to specific actions. For example, when a user recites "increase volume" the electronic device can recognize the command and subsequently increase the volume. Eye tracking involves tracking the eye focus (or gaze) of a user when the user views a display. The eye tracking can identify areas on the display of interest to the user. For example, when a user focuses on a specific area of the screen, such as a menu icon, the electronic device can open the menu without requiring the user to manually select the icon. Lip reading can track the movement of the user's lips and derive a command similar to a voice command from the user. Lip reading can supplement the natural language processing, when the received command is ambiguous, unclear, muffled, inaudible, or the like. Additionally, lip reading can replace the natural language processing, if the user provides an inaudible command, such as forming a word with one's mouth, while not uttering a sound.

According to embodiments of the present disclosure, contextual voice command improves user control of an electronic device, by providing the electronic device a more accurate understanding of a specific command spoken by a user. For example, contextual information includes information of what the user is specifically looking at on a display. The context of what the user is looking at can significantly improve natural language processing of a vague command. The addition of lip reading can allow a user to silently provide a command simply my moving ones mouth. Lip reading also improves natural language processing by disregarding extraneous sounds when the user provides a command. For example, there are instances when natural language processing is unable to identify a verbal command, such as when the user is in an environment with lots of noise. Additionally, natural language processing can incorporate voice recognition to identify that the speaker is the user, and focus on the words of the user to prevent external noise from being misrecognized as speech emitted by the user.

Contextual voice command as used herein are not limited to a personal use. That is, such implementation can be incorporated and used in a variety of locations and industries, such as in as commerce, industry, education, government, and the like.

Embodiments of the present disclosure provide for situations where different variations of contextual voice commands are possible. Those skilled in the art will appreciate that embodiments of the present disclosure can be practiced without some specific details described below, and indeed will see that multiple other variations and embodiments can be practiced.

FIG. 1 illustrates an example system 100 according to this disclosure. The embodiment of the system 100 shown in FIG. 1 is for illustration only. Other embodiments of the system 100 can be used without departing from the scope of this disclosure.

As shown in FIG. 1, system 100 includes network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between various server(s) 104 and various client devices 106-116. Server 104 can represent one or more servers. Each server 104 includes any suitable computing or processing device that can provide computing services for one or more client devices. Each server 104 can, for example, include one or more processing devices, one or more memories storing instructions and data, and one or more network interfaces facilitating communication over the network 102.

Each client device 106-116 represents any suitable computing or processing device that interacts with at least one server or other client device(s) over the network 102. In this example, the client devices 106-116 include a desktop computer 106, a mobile telephone or mobile phone 108 (such as a smartphone), a personal digital assistant (PDA) 110, a laptop computer 112, a tablet computer 114, and head mounted display (HMD) 116. However, any other or additional client devices can be used in the system 100.

In various embodiments of system 100, client devices 106-116 communicate either directly or indirectly with the network 102. For example, one or more client devices 106-116 can communicate with network 102 via one or more base stations (not shown) such as cellular base stations or eNodeBs (eNBs). Also, one or more client devices 106-116 can communicate with network 102 via one or more wireless access points (not shown) such as Institute of Electrical and Electronics Engineers communication standard 802.11 ("IEEE 802.11") wireless access points. Note that these are for illustration only and that each client device can communicate directly with the network 102 or indirectly with the network 102 via any suitable intermediate device(s) or network(s). For example, HMD 116 can communicate with server 104 directly or indirectly. For another example, HMD 116 can communicate with desktop computer 106 via a wired connection without accessing network 102.

In certain embodiments, HMD 116 transmits information securely and efficiently to another device, such as, for example, server 104, or any other client device 106-114.

HMD 116 is able to track a user's eye movement, track a user's lip movement, display content on a display, or a combination thereof. For example, HMD 116 can include multiple camera sensors or motion sensors to record and track various movements of the user. In certain embodiments, a tracking camera is able to track lips or eyes of a user at a regular predetermined time interval, such as, capturing the position of the lips or eyes via an image taken every five milliseconds. In certain embodiments, a tracking camera is able to track lips or eyes of a user at an irregular time interval, by detecting movement. It is noted that the times listed are for example only and other time periods can be utilized.

Although FIG. 1 illustrates one example of a system 100, various changes can be made to FIG. 1. For example, the system 100 can include any number of each component in any suitable arrangement. In general, computing and communication systems come in a wide variety of configurations, and FIG. 1 does not limit the scope of this disclosure to any particular configuration. While FIG. 1 illustrates one operational environment where various features disclosed in this patent document can be used, these features can be used in any other suitable system.

Figure 2:
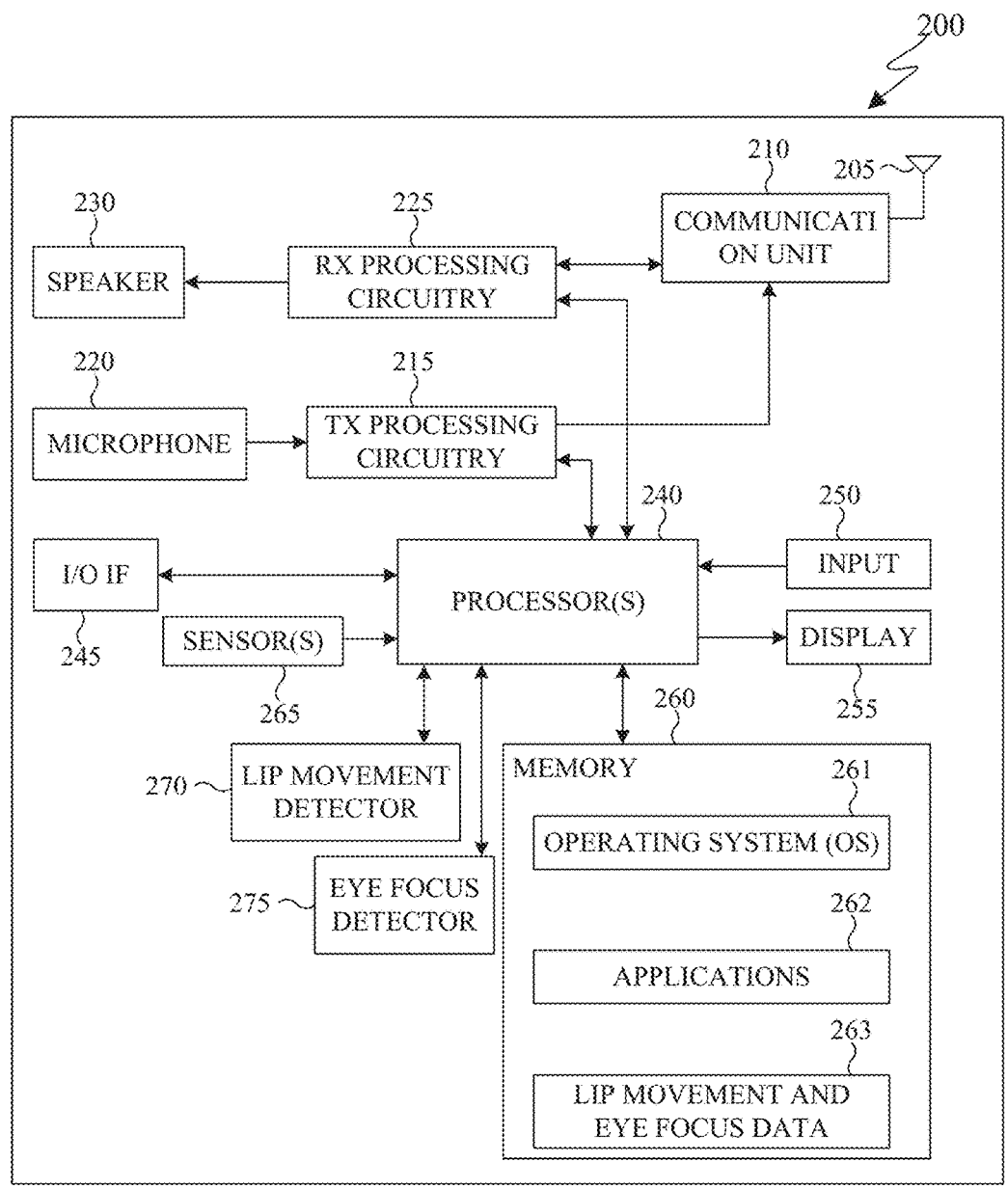
FIG. 2 illustrates an example electronic device, in accordance with an embodiment of this disclosure.

FIG. 2 illustrates an electronic device, in accordance with an embodiment of this disclosure. The embodiment of the electronic device 200 shown in FIG. 2 is for illustration only and other embodiments can be used without departing from the scope of this disclosure. The electronic device 200 can come in a wide variety of configurations, and FIG. 2 does not limit the scope of this disclosure to any particular implementation of an electronic device. In certain embodiments, one or more of the client devices 104-116 of FIG. 1 can include the same or similar configuration as electronic device 200.

In certain embodiments, the electronic device 200 is a mobile communication device, such as, for example, a head mountable display, such as HMD 116 of FIG. 1. In certain embodiments, the electronic device 200 is a subscriber station, a wireless terminal, a smart phone, such as or similar to mobile phone 108 of FIG. 1, mobile device, such as or similar to one or more of: PDA 110, laptop computer 112, or tablet computer 114 or of FIG. 1, a desktop computer, such as or similar to desktop computer 106 of FIG. 1, a tablet, such as or similar to tablet computer 114 of FIG. 1, and the like. In certain embodiments, electronic device 200 is a mobile communication device that is useable with data transfer applications, such as capturing lip movement and eye focus tracking of content on a display. Electronic device 200 can represent one or more tracking systems or one or more image processing devices discussed in more detail below with respect to FIG. 3. In certain embodiments, electronic device 200 can provide look-up tables for spoken words. In certain embodiments, electronic device 200 can provide object recognition through various computer vision (CV) processes or artificial intelligence (AI) processes, or both.

As shown in FIG. 2, the electronic device 200 includes an antenna 205, a communication unit 210, transmit (TX) processing circuitry 215, a microphone 220, and receive (RX) processing circuitry 225. In certain embodiments, the communication unit 210 is a general communication interface and can include, for example, a RF transceiver, a BLUETOOTH transceiver, or a WI-FI transceiver ZIGBEE, infrared, and the like. The electronic device 200 also includes a speaker 230, a processor 240, an input/output (I/O) interface 245, an input 250, a display 255, a memory 260, sensor(s) 265, lip movement detector 270, and eye focus detector 275. The memory 260 includes an operating system (OS) 261, one or more applications 262, and lip movement and eye focus data 263. The memory 260 can include voice recognition dictionary containing learned words and commands.

The communication unit 210 receives, from the antenna 205, an incoming RF signal such as a BLUETOOTH or WI-FI signal from an access point (such as a base station, WI-FI router, BLUETOOTH device) of the network 102 (such as Wi-Fi, BLUETOOTH, cellular, 5G, LTE, LTE-A, WiMAX, or any other type of wireless network). The communication unit 210 down-converts the incoming RF signal to generate an intermediate frequency or baseband signal. The intermediate frequency or baseband signal is sent to the RX processing circuitry 225 that generates a processed baseband signal by filtering, decoding, or digitizing, or a combination thereof, the baseband or intermediate frequency signal. The RX processing circuitry 225 transmits the processed baseband signal to the speaker 230, such as for voice data, or to the processor 240 for further processing, such as for web browsing data or image processing, or both.

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, digitizes, or a combination thereof, the outgoing baseband data to generate a processed baseband or intermediate frequency signal. The communication unit 210 receives the outgoing processed baseband or intermediate frequency signal from the TX processing circuitry 215 and up-converts the baseband or intermediate frequency signal to an RF signal that is transmitted via the antenna 205.

The processor 240 can include one or more processors or other processing devices and execute the OS 261 stored in the memory 260 in order to control the overall operation of the electronic device 200. For example, the processor 240 can control the reception of forward channel signals and the transmission of reverse channel signals by the communication unit 210, the RX processing circuitry 225, and the TX processing circuitry 215 in accordance with well-known principles. The processor 240 is also capable of controlling the lip movement detector 270 or the eye focus detector 275 or both. The processor 240 is also capable of executing other applications 262 resident in the memory 260, such as, one or more applications for image processing. The processor 240 can include any suitable number(s) and type(s) of processors or other devices in any suitable arrangement. For example, the processor 240 is capable of natural langue processing, voice recognition processing, object recognition processing, and the like. In some embodiments, the processor 240 includes at least one microprocessor or microcontroller. Example types of processor 240 include microprocessors, microcontrollers, digital signal processors, field programmable gate arrays, application specific integrated circuits, and discreet circuitry.

The processor 240 is also capable of executing other processes and programs resident in the memory 260, such as operations that receive, store, and timely instruct by providing voice and image capturing and processing. The processor 240 can move data into or out of the memory 260 as required by an executing process. In some embodiments, the processor 240 is configured to execute a plurality of applications 262 based on the OS 261 or in response to signals received from eNBs or an operator.

The processor 240 is also coupled to the I/O interface 245 that provides the electronic device 200 with the ability to connect to other devices such as the client devices 106-116. The I/O interface 245 is the communication path between these accessories and the processor 240

The processor 240 is also coupled to the input 250 and the display 255. The operator of the electronic device 200 can use the input 250 to enter data or inputs, or a combination thereof, into the electronic device 200. Input 250 can be a keyboard, touch screen, mouse, track ball or other device capable of acting as a user interface to allow a user in interact with electronic device 200. For example, the input 250 can include a touch panel, a (digital) pen sensor, a key, or an ultrasonic input device. The touch panel can recognize, for example, a touch input in at least one scheme along with a capacitive scheme, a pressure sensitive scheme, an infrared scheme, or an ultrasonic scheme. In the capacitive scheme, the input 250 is able to recognize a touch or proximity. Input 250 can be associated with sensor(s) 265, a camera, or a microphone, such as or similar to microphone 220, by providing additional input to processor 240. In certain embodiments, sensor 265 includes inertial sensors (such as, accelerometers, gyroscope, and magnetometer), optical sensors, motion sensors, cameras, pressure sensors, heart rate sensors, altimeter, breath sensors (such as microphone 220), and the like. Input 250 can be associated with lip movement detector 270 and eye focus detector 275. Input 250 can include one or more cameras for eye and lip movement detection and a microphone (similar to microphone 220) for audible voice command reception. The input 250 also can include a control circuit.

The display 255 can be a liquid crystal display, light-emitting diode (LED) display, organic LED (OLED), active matrix OLED (AMOLED), or other display capable of rendering text and graphics, such as from websites, videos, games and images, and the like. Display 255 can be sized to fit within a HMD. Display 255 can be a singular display screen or multiple display screens for stereoscopic display. In certain embodiments, display 255 is a heads up display (HUD).

The memory 260 is coupled to the processor 240. Part of the memory 260 can include a random access memory (RAM), and another part of the memory 260 can include a Flash memory or other read-only memory (ROM).

The memory 260 can include persistent storage (not shown) that represents any structure(s) capable of storing and facilitating retrieval of information (such as data, program code, or other suitable information on a temporary or permanent basis). The memory 260 can contain one or more components or devices supporting longer-term storage of data, such as a ready only memory, hard drive, Flash memory, or optical disc. The memory 260 also can contain lip movement and eye focus data 263 received from lip movement detector 270, eye focus detector 275 or one or more image capturing devices, such as sensor 265. Lip movement and eye focus data 263 can contain tracking points associated with objects in each image. Lip movement and eye focus data 263 can include voice recognition training data, or look up tables of learned vocabulary or both.

Electronic device 200 further includes one or more sensor (s) 265 that are able to meter a physical quantity or detect an activation state of the electronic device 200 and convert metered or detected information into an electrical signal. In certain embodiments, sensor 265 includes inertial sensors (such as accelerometers, gyroscopes, and magnetometers), optical sensors, motion sensors, cameras, pressure sensors, heart rate sensors, altimeter, breath sensors (such as microphone 220), and the like. For example, sensor(s) 265 can include one or more buttons for touch input (such as on the headset or the electronic device 200), a camera, a gesture sensor, a gyroscope or gyro sensor, an air pressure sensor, a magnetic sensor or magnetometer, an acceleration sensor or accelerometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an Infrared (IR) sensor, an ultrasound sensor, an iris sensor, a fingerprint sensor, and the like. The sensor(s) 265 can further include a control circuit for controlling at least one of the sensors included therein. The sensor(s) 265 can be used to determine an orientation and facing direction, as well as geographic location of the electronic device 200. Any of these sensor(s) 265 can be disposed within the electronic device 200, within a headset configured to hold the electronic device 200, or in both the headset and electronic device 200, such as in embodiments where the electronic device 200 includes a headset.

Lip movement detector 270 is utilized as a multimodal interface for the electronic device 200. Lip movement detector 270 includes one or more sensors such as a camera to detect and monitor a mouth and lips of a user. Lip movement detector 270 can utilize an image based lip and mouth tracker. Lip movement detector 270 monitors the lower part of a face of the user to detect movement, capture movement, record movement, or a combination thereof. Lip movement detector 270 can also track the motion of the tongue of a user. In certain embodiments, lip movement detector 270 then determines words and phrases based on the shape of the mouth of the user. For example, data of lip movement image signals can be saved in lip movement and eye focus data 263. The processor 240 can also perform natural linage processing. The processor 240 can analyze the lip movements and associate specific movement patterns with spoken words of the user, based on the natural language processing. The combination of the natural language processing and image processing of the lip movement detector 270 continually increase the accuracy of deriving meaning from lip movements of the user by associated specific movements with specific words and phrases.

Eye focus detector 275 monitors, tracks, and measures the location an eye, to identify where the eye is looking. Eye focus detector 275 can utilize a video based eye tracker. For example, a camera focuses on one or both eyes and records movements of each eye as the viewer looks at some kind of stimulus, such as a GUI. In certain embodiments, eye focus detector 275 utilizing a camera and IR or near-infrared light source, such as non-collimated light can detect light reflecting off the cornea or another portion of the eye. Eye focus detector 275 can then derive a vector between the center of the pupil, the light source, and the reflection of light. The vector can then indicate a location of where the user is looking. Eye tracking techniques can include a source light positioned either coaxial with the optical path of the eye, or the light source is offset, among others.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one for natural language processing, and one for voice recognition processing. Also, while FIG. 2 illustrates the electronic device 200 configured as a mobile telephone, tablet, or smartphone, the electronic device 200 can be configured to operate as other types of mobile or stationary devices.

Figure 3:
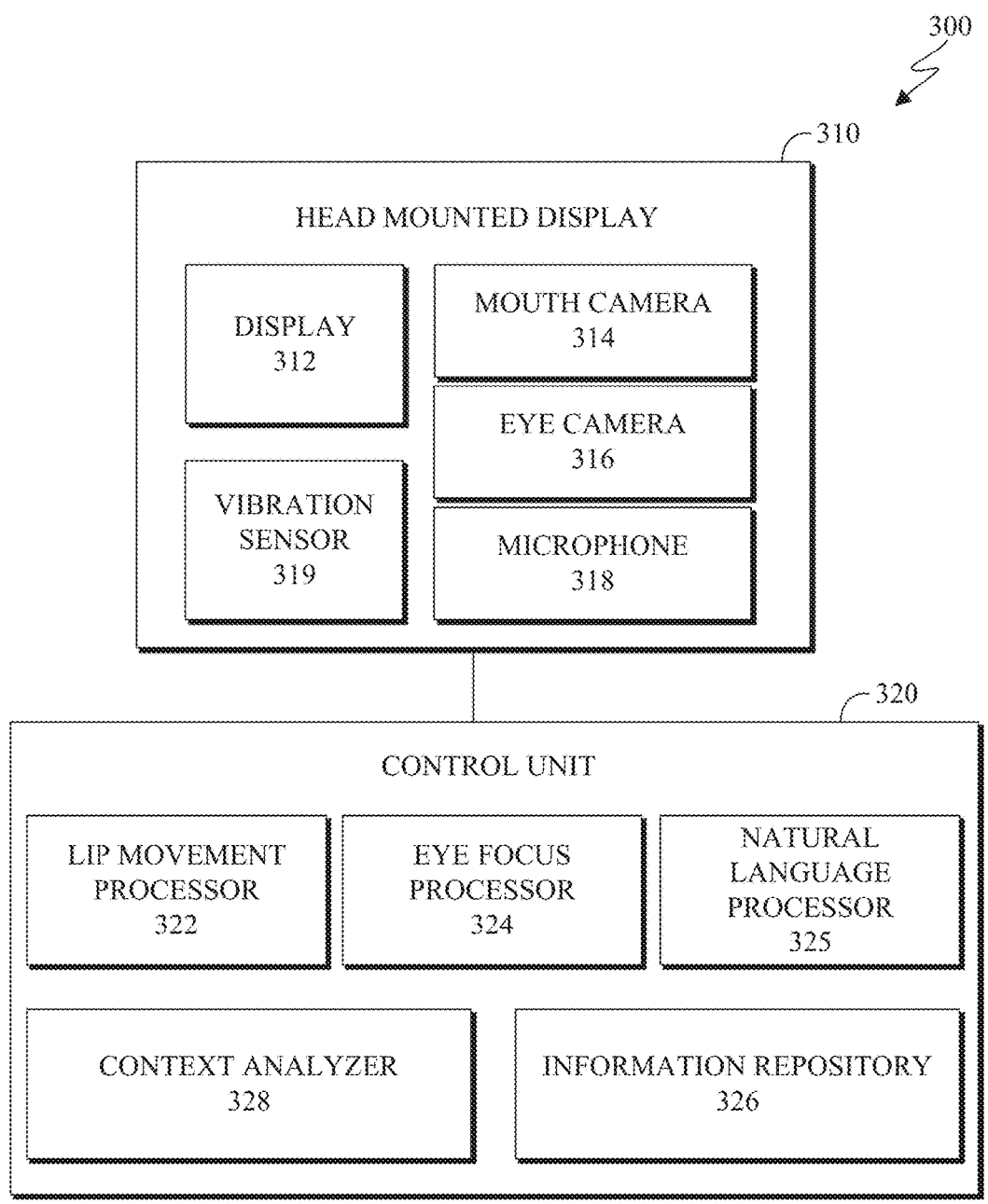
FIG. 3 illustrates an example block diagram, in accordance with an embodiment of this disclosure

FIG. 3 illustrates a block diagram of an example environment architecture 300, in accordance with an embodiment of this disclosure. FIG. 3 illustrates a high-level architecture, in accordance with an embodiment of this disclosure. The embodiment of the environment architecture 300 shown in FIG. 3 is for illustration only. Other embodiments can be used without departing from the scope of the present disclosure.

FIG. 3 illustrates an embodiment of the environment architecture 300, where a head mounted display 310 is associated with control unit 320. Head mounted display 310 can be configured similar to any of the one or more client devices 106-116 of FIG. 1, and can include internal components similar to that of electronic device 200 of FIG. 2. Control unit 320 can be included as part of head mounted display 310 or a standalone device. In certain embodiments, when control unit is a standalone device, control unit 320 can be configured similar to any of the one or more client devices 104-116 of FIG. 1, such as server 104, and can include internal components similar to that of electronic device 200 of FIG. 2.

In certain embodiments, the control unit 320 and head mounted display 310 can be interconnected over a network, similar to network 102 of FIG. 1. In certain embodiments, the network represents a "cloud" of computers interconnected by one or more networks, where the network is a computing system utilizing clustered computers and components to act as a single pool of seamless resources when accessed. In certain embodiments, the network is connected with one or more AI systems to assist in detecting, and determining contextual voice commands. In certain embodiments, the network can be connected to an information repository, such as a database, that contains a look-up tables and information pertaining to various voice commands, lip movements and processing components for performing various commands based on the user's focus Head mounted display 310 is an electronic device that can display content, such as text, images and video, through a GUI, such as display 312. In certain embodiments, the head mounted display 310 is worn on the head of a user or part of a helmet similar to HMD 116 of FIG. 1. In certain embodiments, head mounted display 310 is an electronic device similar to any client devices 106-116 of FIG. 1, such as mobile phone 108, tablet computer 114. Head mounted display 310 can display can display both virtual reality (VR), augmented reality (AR), or mixed reality (MR) or a combination thereof. Head mounted display 310 includes display 312, mouth camera 314, eye camera 316, microphone 318, and vibration sensor 319. Head mounted display 310 can also include speakers, haptic feedback, and other feedback techniques.

Display 312 is similar to display 255 of FIG. 2. In certain embodiments, display 312 is a single display. In certain embodiments, display 312 is two displays, for a stereoscopic display, by providing a single display for each eye. In certain embodiments, display 312 is a transparent display, such as see through glasses, allowing the user to see through the head mounted display 310.

Mouth camera 314 is similar to lip movement detector 270 or sensor 265 of FIG. 2. In certain embodiments, mouth camera 314 is a singular camera positioned to capture movements of the mouth of a user. For example, the mouth camera 314 can be on the external surface of the head mounted display 310. Mouth camera 314 can include capturing sensors similar to a color camera, such as a red green blue (RBG) sensor, an IR sensor (IR), a UV sensor, an ultrasound sensor, or the like. In certain embodiments, mouth camera 314 is a camera that includes a single sensor that can capture both RGB and IR images. In certain embodiments, mouth camera 314 includes two or more cameras. For example, one camera can be on a boom to capture a specific angle of the mouth, while another camera is located on the bottom side of the head mounted display 310. In certain embodiments, mouth camera 314 continually monitors the user's mouth for movement. Once movement is detected, the movement is transmitted to lip movement processor 322, of the control unit 320.

Eye camera 316 is similar to eye focus detector 275 or sensor 265 of FIG. 2. In certain embodiments, eye camera 316 is a singular camera and apparatus to detect a eye focus of a user. For example, the eye camera 316 can be on an internal surface on the head mounted display 310 positioned to view the user's eyes. In certain embodiments, eye camera 316 can have two or more cameras. For example, a first camera solely tracks the right eye and a second camera solely tracks the left eye of the user.

Microphone 318 is similar to microphone 220 of FIG. 2. Microphone 318 receives sound waves such as voice data and converts the sound waves into electrical signal. The voice data received from microphone 318 can be associated with the natural language processor 325 to interpret one or more actions commanded by a user. Microphone 318 can be a microphone similar to a dynamic microphone, a condenser microphone, a piezoelectric microphone, or the like.

Head mounted display 310 can include vibration sensor 319. Vibration sensor 319 can be similar to sensor(s) 265 of FIG. 2. In certain embodiments, vibration sensor 319 is associated with the mouth camera 314 to detect additional information regarding facial movements when the user speaks. The vibration sensor 319 can also detect if the user taps on the head mounted display 310 as an input gesture. In certain embodiments, the vibration sensor 319 is omitted from head mounted display 310.

Control unit 320 can be a standalone device connected to head mounted display 310 or part of the head mounted display 310. The control unit 320 includes lip movement processor 322, eye focus processor 324, natural language processor 325, information repository 326, and context analyzer 328. In certain embodiments inputs into the various elements within control unit 320 are time stamped.

Lip movement processor 322 can be in communication with mouth camera 314 and can be similar to lip movement detector 270 of FIG. 2. Lip movement processor 322 can track the motion of the lips, mouth, tongue, or a combination thereof. Lip movement processor 322 derives words and phrases based on the shape and movement of the user's mouth. For example, the mouth camera 314 monitors and detects movement of the user's mouth. Thereafter, the lip movement processor 322 derives a command given by the user based on the user's mouth movements. The command generated by the lip movement processor 322 is referred to as a derived command, as the command is derived based on the mouth, lip, and tongue movement of the user. The derived command can be similar to lip reading.

Eye focus processor 324 can be in communication with eye camera 316 and can be similar to eye focus detector 275 of FIG. 2. Eye focus processor 324 can track the motion of user's eyes via eye camera 316 and associate the movement with a particular item on the display screen. For example, a user focuses on a particular object on the display 312, when the user's eyes pause over that object. In certain embodiments, eye focus processor 324 is associated with display 312. For example, eye focus processor 324 can parse the content displayed on the display 312, such as images or video, to derive the various objects of the displayed content. Therefore, based on a user's eye position, eye focus processor 324 can extrapolate a focus point, object or location at which the user is looking. For example, eye focus processor 324 can determine a coordinate on the display screen at which the eye is focused, and parse the images or video displayed on the display 312 to identify, the object at or around the determined coordinate. Eye focus processor 324 can parse the images or video displayed on the display 312 to identify (i) text, (ii) icons, (iii) slide controller (such as a scroll mechanism) (iv) a hyperlink, (v) a person in an image or video, (vi) landmarks, (vii) objects, and the like. Eye focus processor 324 can extrapolate from a single point on a display an object the user is focusing at. For example, if a user is focusing on a single area on the display 312, the eye focus processor 324 can expand the single focus point to include the entirety of a person, object, or the like displayed on the display 312.

Natural language processor 325 allows a user to interact with the head mounted display 310 through voice and speech. Natural language processor 325 can include a natural language processor for converting a user's speech into executable instructions. Natural language processor 325 allows a user to control head mounted display 310 by talking to the device. For example, a user can speak a command and natural language processor 325 can extrapolate the sound waves and perform the given command. In certain embodiments, natural language processor 325 utilizes voice recognition, such as voice biometrics, to identify the user based on a voice pattern of the user, in order to reduce, filter or eliminate commands not originating from the user.

In certain embodiments, lip movement processor 322 is associated with natural language processor 325 to match movements of the user's mouth with spoken words. For example, by reconciling movements of the mouth with spoken words, provides an improved the accuracy of the natural language processor 325. For another example, the user can inaudibly speak a command and lip movement processor 322 is able to derive the action to perform, even when a voice command was not detected via the natural language processor 325. In another example, if the natural language processor 325 is unable to derive a command from the user due to extensive environmental, ambient or external noise, then lip movement processor 322 can determine if the user spoke and derive a command associated therewith.

Information repository 326 can be similar to memory 260 of FIG. 2. In certain embodiments, information repository 326 can be similar to lip movement and eye focus data 263 of FIG. 2. Information repository 326 can store data gathered by sensors 265 of FIG. 2, mouth camera 314 and eye camera 316. Data stored in information repository 326 includes various geographical locations, captured video and pictures from mouth camera 314 and eye camera 316, as well as games, images, and videos capable of being displayed on the display 312. Data stored in information repository 326 can include various learned commands. In certain embodiments, information repository 326 maintains a log of the recently focused areas on the display 312, and objects located at or near the eye focus coordinates. For example, information repository can maintain eye focus coordinates based on time of by timestamp. Therefore, if the user provides a command, and the object is no longer displayed on the display 312 (such as a movie, where the individual image frames continually change), context analyzer 328 can review the log of the image segments, and determine the subject of the issued command. Context analyzer 328 can utilize computer vision, or object recognition, AI, or a combination thereof to identify the subject matter of an eye focus. In certain embodiments, information repository 326 includes a circular buffer that identifies and stores coordinates of the user's eye focus during a time threshold. Therefore, if the content depicted on the display 312 changes between the start and end of the command from the user, the circular buffer of information repository 326 can be checked by context analyzer 328 and the subject of the user's gaze analyzed to carry out the command. Similarly, if the content depicted on the display 312 changes prior to the start of a user's command, the circular buffer of information repository 326 can be checked by context analyzer 328 and the subject of the user's gaze analyzed to carry out the command.

Context analyzer 328 performs contextual analysis by interconnecting the natural language processor 325, with the data generated from the lip movement processor 322 and eye focus processor 324, to determine the intended command and perform the command as intended by the user. In certain embodiments, context analyzer 328 only determines the intent of the command and passes the command to other applications to execute the command. In certain embodiments, context analyzer 328 determines the intent and executes the determined command. Context analyzer 328 determines various actions to perform based on what the user is viewing coupled with verbal voice command and lip movement or a combination thereof. For example, context analyzer 328 is able to determine an operation to perform when a vague voice command is given by utilizing the context of what the user is viewing, or based on the lip movements of the user, or both. That is, context analyzer 328 derives contextual meanings of subject matter being observed by the user or spoken by the user or a combination thereof. Context analyzer 328 can identify contextual information through objects the user is viewing, the words the user speaks, or movements of the user's mouth or a combination thereof.

Based on the eye focus or lip movement of the user, supplemental contextual information can be derived in conjunction to or as a replacement of a voice command. The eye focus can increase the speed of the selection process of a user input by reducing or eliminating the use of external devices, such as a keyboard, mouse or remote as well as reduce user inputs through motions sensors that detect motion of the head mounted display 310. Based on the additional contextual information, the head mounted display 310 is able to provide an enhanced understanding of the user's command. The lip movement of the user generates a derived command that can be used to confirm a received voice command. In certain embodiments, context analyzer 328 is able to extract relevant information from the context of the eye focus of the user or lip movement of the user or a combination thereof.

In certain embodiments, context analyzer 328 detects a command by the user via one or more, sensors such as mouth camera 314, eye camera 316, microphone 318, or vibration sensor 319, or a combination thereof. Thereafter, context analyzer 328 performs voice recognition (to confirm the identity of the speaker), natural language processing (via natural language processor 325), word parsing, or deriving the command from the user's lip movement (via lip movement processor 322) or a combination thereof, in order to interpreted the given command. Context analyzer 328 can also obtain eye tracking data via eye focus processor 324 to determine the eye focus of the user in relation to the rest of the content on display 312 in order to determine to what portion or object displayed on display 312 to apply the command.

The object of the eye focus displayed on display 312, can be analyzed by computer vision or AI to identify the person or object of the eye focus of the user. If the command was related to identifying a person or object, context analyzer 328 can convey the identity of the person or object to the user. Context analyzer 328 can overlay the name of the person or object, provide an audio identification, or highlight the object or person in conjunction with an audio identification or a combination thereof. Context analyzer 328 is also able to provide supplemental information such as offering to provide a source that will provide additional information about the identified object or person, such as an online database, website, and the like.

Context analyzer 328 utilizes the eye focus to when executing a voice command. When context analyzer 328 receives a voice command that can be interpreted multiple different ways, receives an incomprehensible voice command, or detects a silent command, or a combination thereof, then context analyzer 328 adjusts the original command based on the ancillary information, such as the lip movement processor, the eye focus processor or the natural language processor or a combination thereof.

Context analyzer 328 identifies a specific application to close if multiple applications are displayed based on the eye focus of the user coupled with a generic command to close an application. That is, upon a command of "close this application," context analyzer 328 can identify a particular application based on the eye focus of the user, and close the application. Thereby providing context to an otherwise ambiguous or vague command. Similarly, context analyzer 328 can confirm the voice command by comparing the voice command to the derived command as determined by the lip movement processor 322.

Context analyzer 328 utilizes the eye focus to perform voice commands such as identifying a specific application to open. For example, upon a command of "open this application," context analyzer 328 can identify a particular application icon based on the eye focus of the user, and open the application. Thereby providing context to an otherwise ambiguous or vague command. Similarly, context analyzer 328 can confirm the voice command by comparing the voice command to the derived command as determined by the lip movement processor 322.

Context analyzer 328 utilizes a verbal command while ignoring the eye focus, if the user provides an ambiguous command. For example, if an ambiguous command is given within a short period of audio content, the context analyzer 328 can ignore the eye focus and perform the action based on context derived from the audio content. In certain embodiments, context analyzer 328 extrapolate context from other sources such as the content the user is experiencing. For if the content is a movie or music, context analyzer 328 can identify the genre. Thereafter context analyzer 328 provides an appropriate response to maintain the atmosphere of the content viewed by the user. For example, if the user is watching an action movie, context analyzer 328 can provide a response that reduces any interfere with the displayed content on display 312. For another example, if the user is watching a horror movie, context analyzer 328 can provide a response, by providing a series of subtitles on the display in lieu of speaking, to maintain the level of suspense by reducing the response spoken via the speakers.

Context analyzer 328 utilizes the eye focus to perform a non-specific voice commands such as performing a zoom or scroll function. For example, upon a command of "increase," context analyzer 328 can identify a particular application based on the eye focus of the user, and zoom in. Similarly, upon receiving a command of "decrease," context analyzer 328 can identify a particular application based on the eye focus of the user, and zoom out. For another example, upon receiving a non-specific command of "scroll up," or "scroll down," context analyzer 328 identifies a particular application based on the eye focus of the user to perform the, scroll up or down action. This example provides context to a given command. Similarly, context analyzer 328 can confirm the voice command by comparing the voice command of "increase," "decrease," "scroll up," or "scroll down," to the derived command as determined by the lip movement processor 322.

Context analyzer 328 utilizes the eye focus to perform voice commands such as activating certain control buttons or objects. For example, upon a command of "click," "enter," "activate," or the like, context analyzer 328 can identify a particular icon, menu button, and perform the function Thereby providing context to an otherwise ambiguous or vague command. Similarly, context analyzer 328 can confirm the voice command by comparing the voice command of "click," "enter," "activate," or the like, to the derived command as determined by the lip movement processor 322.

Context analyzer 328 utilizes the eye focus to perform voice commands to open an application and then perform various functions associated therewith. For example, context analyzer 328 can utilize the eye focus to perform a command of "open this application," while the user's eye focus is on the email application icon. Thereafter, context analyzer 328 can open the email application, followed by opening a new email and dictating a message, based on subsequent voice commands and eye focus context. Similarly, context analyzer 328 can confirm the voice command based on the derived command as determined by the lip movement processor 322. The user can then begin dictating the content of the email. In certain embodiments, if the word recognition falls below a set confidence level on a given word, a list of possible replacement words is displayed on the display 312. Context analyzer 328 can then select the correct word based on the eye focus upon a particular word. In certain embodiments, if the word recognition falls below a set confidence level on a given word, context analyzer 328 can utilize the derived word via the lip movement processor 322. In certain embodiments, if the natural language processor 325 supplies a word that context analyzer 328 determines is inappropriate, then the context analyzer 328 uses the derived word via the lip movement processor 322. For example, if the user is lip movement processor 322 derives that the user said "the sky is blue" while the natural language processor 325 identifies that the user said "the sky is glue," context analyzer 328 can use the derived command, rather than the verbal command, based on a determination that the word "blue" is more appropriate than "glue," in the given instance. In certain embodiments, if the dictation inserts an incorrect word, the user can focus on the particular word, and a list of possible replacement words is displayed on the display 312. Context analyzer 328 can then select the correct word based on the eye focus upon a particular word. This example simplifies the user interface and minimizes errors when dictating a letter.

For another example, a user can provide subsequent commands that relate to the identified object, application, or person, or a separate command about object of interest on display 312. For instance, following context analyzer 328 providing an initial response to a user, the user can respond with a follow up question that accepts or declines additional services in conjunction with another command.

In certain embodiments, context analyzer 328 is associated with a foreign language education application. The foreign language application can audibly recite a word, and displays a variety of objects to the user. The user must focus on the object corresponding to the recited word. This example utilizes eye focus as a user interface technique.

Generally, determining the eye focus on a display (via the eye focus processor 324), deriving the voice command (via the natural language processor 325), and the derived command (via the lip movement processor 322) are all associated with each other, allowing context analyzer 328 to determine various actions to perform, based on the received inputs. In certain embodiments, it is desirable that the eye focus, the voice command, or the derived command, are not associated.

For example, a user can manually deactivate the voice command function, such as when a user is both conducting a conversation with another individual while wearing and operating the head mounted display 310. The user can issue a command, such as "voice off," to disable voice commands. Therefore, neither context analyzer 328 nor natural language processor 325 will perform any received user input voice commands. When the user is ready to reengage the voice commands, the user can recite a simple command such as "voice on." In certain embodiments, the display 312 changes colors, hues, or display an icon indicating the status of the voice command. If display 312 is a stereoscopic display, the appearance of one or both displays can be altered to indicate the status of the lip movement processor, 322, eye focus processor 324, natural language processor 325 or context analyzer 328, or a combination thereof. In certain embodiments, the command to disable and enable voice commands is customizable. In certain embodiments, the command to disable and enable voice commands also disables and enables the lip movement processor 322 for deriving commands, based on the user's lip movements.

For another example, the user can manually deactivate the derived command function via the lip movement processor 322. The user can issue a command to disable and enable the lip movement function. In certain embodiments, the display 312 changes colors, hues, or display an icon indicating the status of the lip movement processors 322 ability to derive a command based on lip movement of the user. If display 312 is a stereoscopic display, the appearance of one or both displays can be altered to indicate the status of one or more elements of environment architecture 300. When lip movement is disabled, the context analyzer 328 is prevented from using lip movement processor 322 to derive a command. In certain embodiments, the command to disable and enable a derived command via the user's lip movements, also disables and enables the natural language processor 325 for deriving commands, based on the user's lip movements.

In another example, the user can manually deactivate the eye focus function while wearing and operating the head mounted display 310. The user can issue a voice command independent of the user's eye focus. The user can issue a command, such as "track off" to disable eye focus. The user can issue a command, such as "track on," to reengage the eye focus. When eye focus is disabled, the context analyzer 328 and natural language processor 325 are prevented from utilizing the user's eye focus as an input to a voice command. For example, if the user is watching a movie and receives an email, if the user issues a command "no track delete," the context analyzer 328 will default and delete the email rather than delete the video. In certain embodiments, the display 312 changes colors, hues, or display an icon indicating the status of the eye focus. If display 312 is a stereoscopic display, the appearance of one or both displays can be altered to indicate a status of one or more elements of environment architecture 300. In certain embodiments, the command to disable and enable eye focus is customizable.

In certain embodiments, context analyzer 328 determines whether to exclude the eye focus of the user in relation to a voice command, and the derived command without an explicit user command. Context analyzer 328 can determine the intent of the user based on additional context, and either not take action or take the intended action. In certain embodiments, context analyzer 328 analyzes the environmental sounds at the time of the user's command.

When, a user wearing and operating the head mounted display 310, suddenly recites "what was that," in response to hearing a sound external to the head mounted display 310, the context analyzer 328 can analyze the environmental sounds at the time of the user's command, in order to derive contextual information proximate to the time of the command. If context analyzer 328 determines that the command was in response to an external noise, context analyzer 328 can disregard the command of the user, both the verbal and the derived command.

For another example, context analyzer 328 can determine that the user is in a conversation with another person, and disregard both the eye focus and the command of the user. For another example, if the user is speaking to another person while wearing and operating the head mounted display 310, the context analyzer 328 can recognize that the user is in a conversation and any verbal command is unrelated to the operation of the head mounted display 310. In certain embodiments, the head mounted display 310 includes additional external sensors such as an external facing camera to enable context analyzer 328 to detect the other person. In certain embodiments, the microphone 318 detects the response to the user from the other person. Therefore, context analyzer 328 is able to recognize that the user is in a conversation and any verbal command is unrelated to the operation of the head mounted display 310 and then ignores or disables voice commands while the conversation occurs.

For another example, context analyzer 328 can receive a derived command via lip movement processor 322. If the derived command is ambiguous, or nonsensible, context analyzer 328 can determine that user is lip singing, if a song playing through a speaker (such as speaker 230) associated with the head mounted display 310 or detected via microphone 318. Thereafter, context analyzer 328 can disregard any derived command.

For another example, context analyzer 328 can determine the intent of the user when the user provides a vague or ambiguous command while gazing at an object depicted on the display 312. Context analyzer 328 can determine that the command given is inappropriate for the object the user is gazing at. For instance, if the user is playing a game, and recites "buy 50" while focusing on an element in the game. Context analyzer 328 can determine that the element is not an item for which multiple units are purchased. Context analyzer 328 is then able to utilize the context to determine what the user is intending. If the user lacks the required game credits to purchase the item, the "buy 50" command can also initiate a purchase of fifty credits in the game to allow the user to purchase the item.

For another example, context analyzer 328 can determine the intent of the user when the user provides a vague or ambiguous command while gazing at an object displayed on the display 312 based on previously receiving a similar command. Context analyzer 328 can analyze previous commands to detect similarities between the current command and the previous command. Upon finding a similarity between the two commands, context analyzer 328 can perform the same action.

For another example, context analyzer 328 can determine the intent of the user when the user provides a vague or ambiguous command while gazing at an object displayed on the display 312 based on previous eye focus coordinates. Context analyzer 328 can respond to commands about past content displayed on display 312. For instance, if a user asks "who was the person who just left?" context analyzer 328 is able to track to a previous frame, to identify a person or object. In certain embodiments, information repository 326 maintains a log of recently focused areas of image segments. The log can be maintained via an information repository 326, or a circular buffer. Therefore when a command relating to a past frame is given, context analyzer 328 can access the log within the information repository 326 and identify the object or person using computer vision, object recognition, or AI, and the like in order to determine the subject of the command. Context analyzer 328 reviews a log of the recently focused areas of image segments, in response to receiving a command relating to a content not currently displayed on the display 312. For instance, when the user is watching a movie via the head mounted display 310, and focuses on a character that moves out of the frame. The user then commands "who was that actor," "who was the person who just left the screen," "what kind of car was he in," "what kind of car did I just see," and the like. Context analyzer 328 then reviews the log of recent eye focus locations coupled with image segments. Context analyzer 328 can then implement a circular buffer to search for the users eye focus in the last frames, to identify an object related to the command. Context analyzer 328 can also utilize image recognition, facial recognition or both. In certain embodiments, image recognition, facial recognition, or both, are continually running in the background and objects are classified while the user watches a movie. Therefore, if the content displayed on the display 312 changes or the eye focus of the user changes between the start and end of the user's command, the context analyzer 328 can determine the intent of the user based on the previous eye focus of the user.

In certain embodiments, the derived command via the lip movement processor 322 supplements or replaces the verbal commands via the natural language processor 325. In certain embodiments, context analyzer 328 is able to extract relevant information from the context of lip movement of the user. Based on the additional context information of the lip movements, the context analyzer 328 provides an enhanced understanding of the command received from the user.

For example, context analyzer 328 can utilize the lip movements of the user to confirm a given voice command. This enables a higher accuracy rate of the natural language processor 325. For instance, if, while viewing a movie on the head mounted display 310, the user states "who is that actor?", context analyzer 328 can confirm a match between the phrase derived by the lip movement processor 322 and the phrase as captured by the natural language processor 325. In certain embodiments, context analyzer 328 requires that the phrase recognized by the lip movement processor 322 and the phrase recognized by the natural language processor 325 match within a specified threshold.

In certain embodiments, if the two recognized phrases do no match within the threshold, context analyzer 328 can prompt user to speak the phrase again. In certain embodiments, if the two recognized phrases do no match within the threshold, context analyzer 328 can execute the command derived via the lip movement processor 322. For example, context analyzer 328 can determine that the ambient noise level exceeds a threshold, and therefore disregards the voice command. In certain embodiments, if the two recognized phrases do no match within the threshold, context analyzer 328 can execute the command derived via the natural language processor 325. For example, context analyzer 328 can determine that the phrase derived from the lip movement processor 322 does not coincide with the intent of the user. If the lip movement processor 322 derives an incoherent phrase, context analyzer 328 can disregard the lip movement. If the lip movement processor 322 derives the phrase unrelated the content displayed on the display 312, context analyzer 328 can disregard the lip movement. For instance, if the lip movement processor 322 derives the phrase of "open" while the user is watching a movie, and the natural language processor 325 recognizes the command "pause," context analyzer 328 will pause the movie, as the open command is ambiguous in this instance. Conversely, if the lip movement processor 322 derives the phrase of "open" while the user is reading emails, and the natural language processor 325 recognizes the command "pause," context analyzer 328 will open an email based on the eye focus, as the pause command is ambiguous in this instance.

In certain embodiments, context analyzer 328 determines that the user performed or issued an inaudible command, such as a silent command. For example, a user can issue a command simply my moving ones mouth, to form words without the need to make a noise. Context analyzer 328 can perform a command derived by lip movement processor 322 even when no verbal command is issued.

In certain embodiments, content displayed on the display 312 and the eye focus data determined via the eye focus processor 324, is shared with additional users via additional displays. For example, if the user is a presenter on a conference call, the user can share his or her eye focus to the participants of the conference call in order to refer to specific diagrams or information. In this example, the presenter wears the head mounted display 310 and the audience views the presentation on a display, such as a monitor. This allows the audience to appreciate what the object of focus of the presenter during the presentation. For another example, a participant of a conference call, without eye tracking capabilities, can give a command through the natural language processor 325, such as "what does this acronym mean" referencing the presenter's focus point. The command can be directed towards the context analyzer 328 and not to the presenter of the conference call. Context analyzer 328 can provide the participant the answer, based on a contextual analysis of the presentation document, or access the internet to research the acronym, or both, to derive the meaning of the acronym at issue.

Figure 4A:
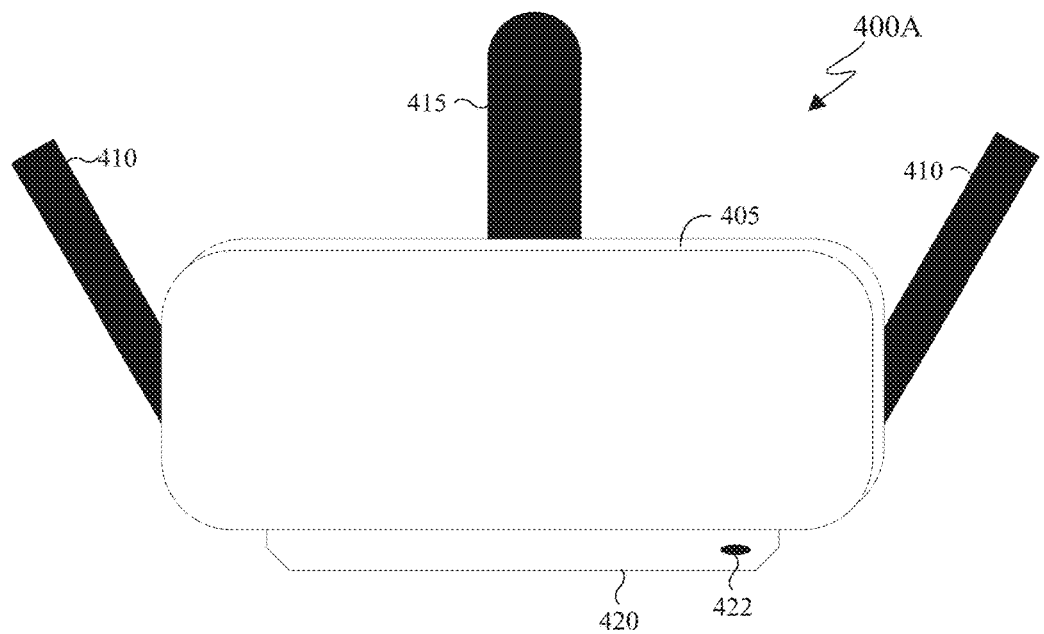
FIG. 4A illustrates an example external view of a head mounted display, in accordance with an embodiment of this disclosure.
Figure 4B:
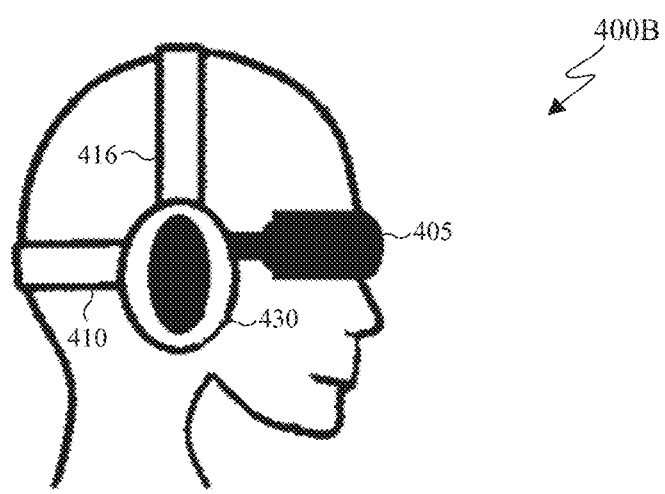
FIG. 4B illustrates an example profile view of the head mounted display as worn by a user, in accordance with an embodiment of this disclosure

FIG. 4A illustrates an example external view of a head mounted display in accordance with an embodiment of this disclosure. FIG. 4B illustrates an example profile view of the head mounted display 405 of FIG. 4A as worn by a user, in accordance with an embodiment of this disclosure. The head mounted display 405, the head straps 410, as illustrated in FIG. 4A can be the same elements, or similar elements, as illustrated in FIG. 4B. FIG. 4A also illustrates head strap 415, while FIG. 4B illustrates head strap 416. The embodiments of environment 400A shown in FIG. 4A and environment 400B of FIG. 4B are for illustration only. Other embodiments can be used without departing from the scope of the present disclosure.

FIG. 4A illustrates an embodiment illustrating a head mounted display 405 can be configured similar to any of the one or more client devices 106-114 of FIG. 1, include internal components similar to that of electronic device 200 of FIG. 2 and head mounted display 310 of FIG. 3. In certain embodiments, the head mounted display 405 is also configured to include control unit 320 of FIG. 3. Head mounted display 405 includes head straps 410 and 415 (and 416 of FIG. 4B) and lip tracking sensor 420 focused downward towards a user's mouth, and a microphone 422.

Head straps 410 illustrate two straps that wrap around the head horizontally to secure the head mounted display 405 on the user's face. For example, head straps 410 wrap around the right and left side of the user's head. Head straps 410 can be affixed to head strap 415 (and 416 of FIG. 4B) to further secure head mounted display 405. Head straps 410 can be secured by a buckle, a snap, VELCRO, other similar fastening mechanism.

Head strap 415 (and 416 of FIG. 4B) illustrates a strap that wraps around the top of the head of the user to further secure the head mounted display 405 to the face of the user. Head strap 415 (and 416 of FIG. 4B) can be secured by a fastener such as buckle, a snap, VELCRO, hook, clasp, or the like. Head straps 410 can be affixed to head strap 415 (and 416 of FIG. 4B) to further secure head mounted display 405. In certain embodiments, head strap 415 (and 416 of FIG. 4B) is omitted.

Lip tracking sensor 420 is affixed to the head mounted display 405 and positioned to capture various movements of the user's lips. Lip tracking sensor 420 is configured similar to lip movement detector 270 of FIG. 2 and can include mouth camera 314 of FIG. 3. In certain embodiments, the lip tracking sensor 420 is an image sensor capable to tracking lip movement. Based on the lip movement, context analyzer 328 of FIG. 3 is able to more accurately understand a command given by the user. For example, lip tracking sensor 420 captures lip movement of the user to allow context analyzer 328 of FIG. 3 to recognize words formed by the movement of the lips and mouth of the user. In certain embodiments, the lip tracking sensor 420 understands speech based on interpreting the movements of the lips, face and tongue of the user.

Lip tracking sensor 420 can include a microphone 422. Microphone 422 can be similar to microphone 220 of FIG. 2, and microphone 318 of FIG. 3. Even though environment 400A illustrates microphone 422 affixed to lip tracking sensor 420, microphone 422 can be affixed at any location and associated with head mounted display 405 to capture spoken words from the user.

FIG. 4B illustrates speaker 430. Speaker 430 represents a speaker positioned over or near the ear of the user. In certain embodiments, speaker 430 is a single speaker of one ear of the user. In certain embodiments, speaker 430 is a pair of speakers located over each ear of the user. Speaker 430 converts electrical signals into audible sound waves projected towards the user's ear.

Figure 5A:
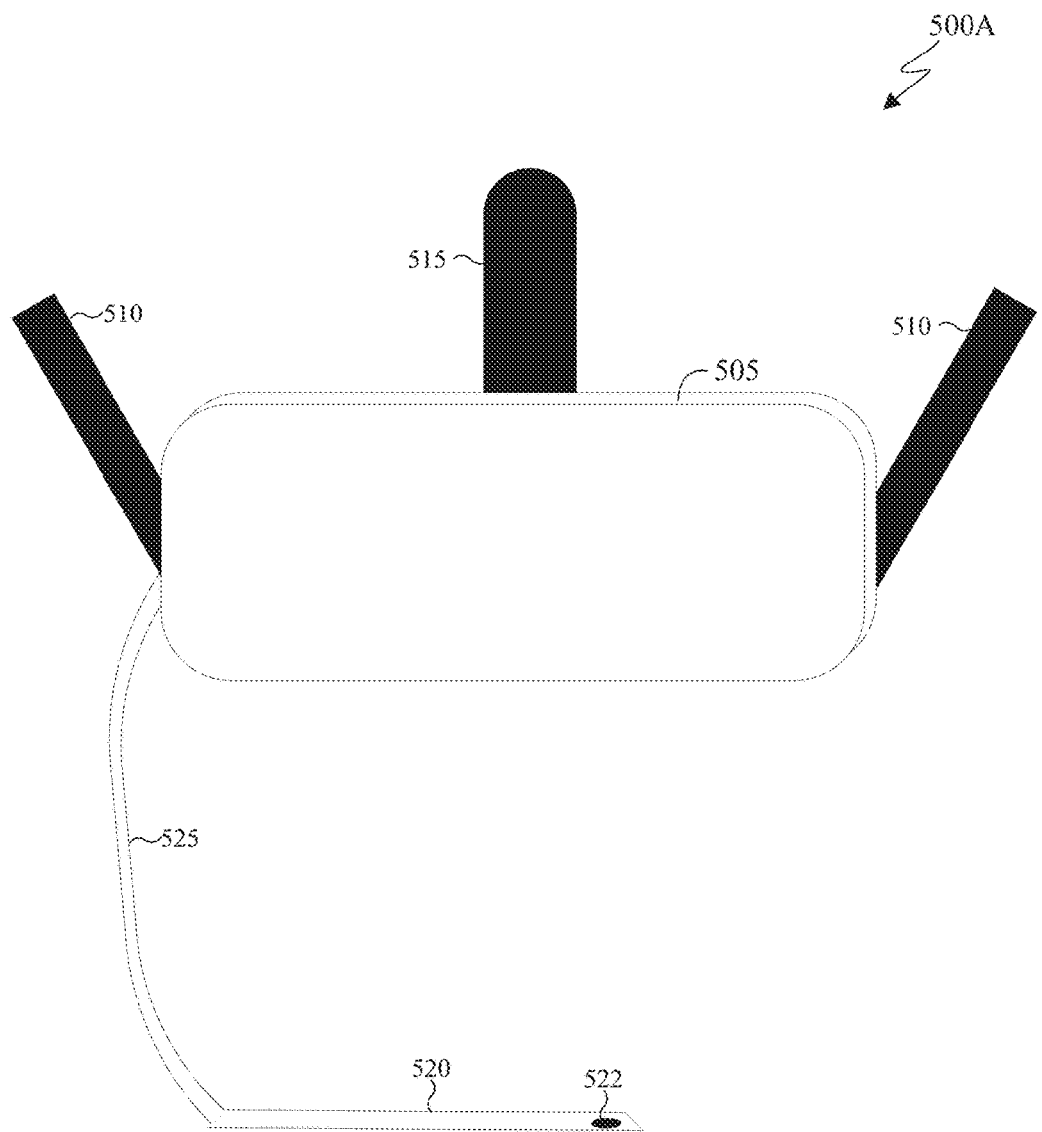
FIG. 5A illustrates an example external view of a head mounted display, in accordance with an embodiment of this disclosure.
Figure 5B:
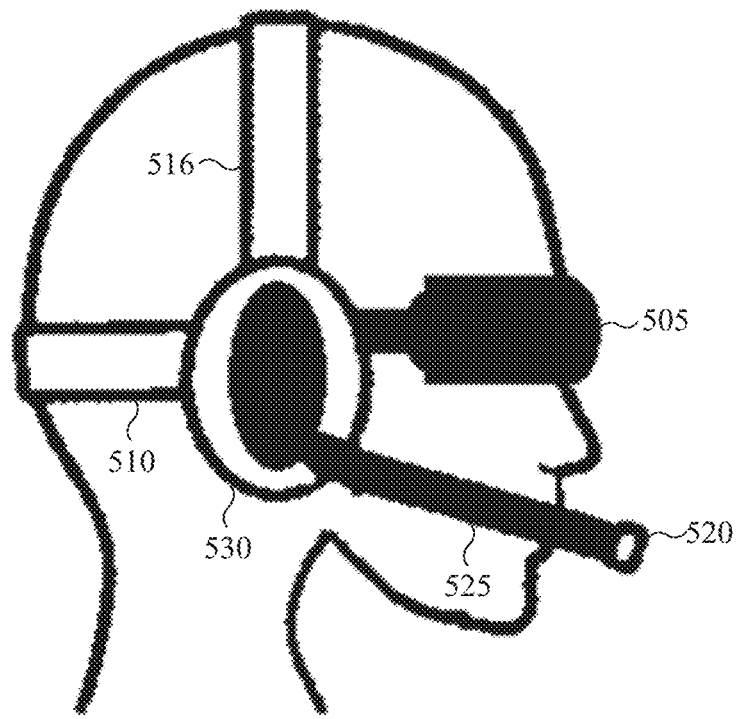
FIG. 5B illustrates an example profile view of the head mounted display as worn by a user, in accordance with an embodiment of this disclosure.

FIG. 5A illustrates an example external view of a head mounted display 505 in accordance with an embodiment of this disclosure. FIG. 5B illustrates an example profile view of the head mounted display as worn by a user, as illustrated in FIG. 5A, in accordance with an embodiment of this disclosure. The head mounted display 505, the head straps 510, lip tracking sensor 520, and boom 525 as illustrated in FIG. 5A are the same as or similar to elements as illustrated in FIG. 5B. FIG. 5A also illustrates head strap 515, while FIG. 5B illustrates head strap 516. The embodiments of environment 500A shown in FIG. 5A and environment 500B of FIG. 5B are for illustration only. Other embodiments can be used without departing from the scope of the present disclosure.

FIG. 5A illustrates an embodiment illustrating a head mounted display 505 can be configured similar to any of the one or more client devices 106-114 of FIG. 1, include internal components similar to that of electronic device 200 of FIG. 2, head mounted display 310 of FIG. 3, and head mounted display 405 of FIGS. 4A and 4B. In certain embodiments, head mounted display 505 is also configured to include control unit 320 of FIG. 3. Head mounted display 505 includes head straps 510 and 515 (and 516 of FIG. 5B) and lip tracking sensor 520 attached via a boom 525, and a microphone 522.

Head straps 510 illustrate two straps that wrap around the head horizontally to secure the head mounted display 505 on user's face. For example, head straps 510 wrap around the right and left side of the user's head. Head straps 510 can be affixed to head strap 515 (and 516 of FIG. 5B) to further secure head mounted display 505. Head straps 510 can be secured by a fastener such as buckle, a snap, VELCRO, hook, clasp, or the like.

Head strap 515 (and 516 of FIG. 5B) illustrates a strap that wraps around the top of the head of the user to secure the head mounted display 505 to the face of the user. Head strap 515 (and 516 of FIG. 5B) can be secured by a buckle, a snap, VELCRO, or the like. Head straps 510 can be affixed to head strap 515 (and 516 of FIG. 5B) to further secure head mounted display 505. In certain embodiments, head strap 515 (and 516 of FIG. 5B) is omitted.

Lip tracking sensor 520 is affixed to the head mounted display 505 via the boom 525 and positioned to capture various movements of the user's lips. Lip tracking sensor 520 is configured similar to lip movement detector 270 of FIG. 2 and can include mouth camera 314 of FIG. 3. In certain embodiments, the lip tracking sensor 520 is an image sensor capable to tracking lip movement. Based on the lip movement, context analyzer 328, of FIG. 3, is able to more accurately understand a command given by the user. For example, lip tracking sensor 520 captures lip movement of the user to allow context analyzer 328 of FIG. 3 to recognize words formed by the movement of the lips and mouth of the user. In certain embodiments, the lip tracking sensor 520 understands speech based on interpreting the e movements of the lips, face and tongue of the user.

Boom 525 is an extension element extending from the head mounted display 505 to provide the lip tracking sensor 520 the ability to capture the user's mouth via the front of the face of the user. In certain embodiments, boom 525 is adjustable. Boom 525 can position the lip tracking sensor 520 to capture the movements of the user's mouth, lips, and tongue to enable context analyzer 328 of FIG. 3, to accurately derive the words spoken by the user.

Lip tracking sensor 520 can include a microphone 522. Microphone 522 is similar to microphone 220 of FIG. 2, and microphone 318 of FIG. 3. Even though, environment 500A illustrates microphone 522 affixed to lip tracking sensor 520, microphone 522 can be affixed to the boom 525 or the head mounted display 505, to capture spoken words from the user.

FIG. 5B illustrates speaker 530. Speaker 530 represent a speaker positioned over or near the ear of the user. In certain embodiments, the speaker 530 is a single speaker of one ear of the user. In certain embodiments, the speaker 530 is a pair of speakers located over each ear of the user. Speaker 530 converts electrical signals into audible sound waves projected towards the user's ear.

Figure 6A:
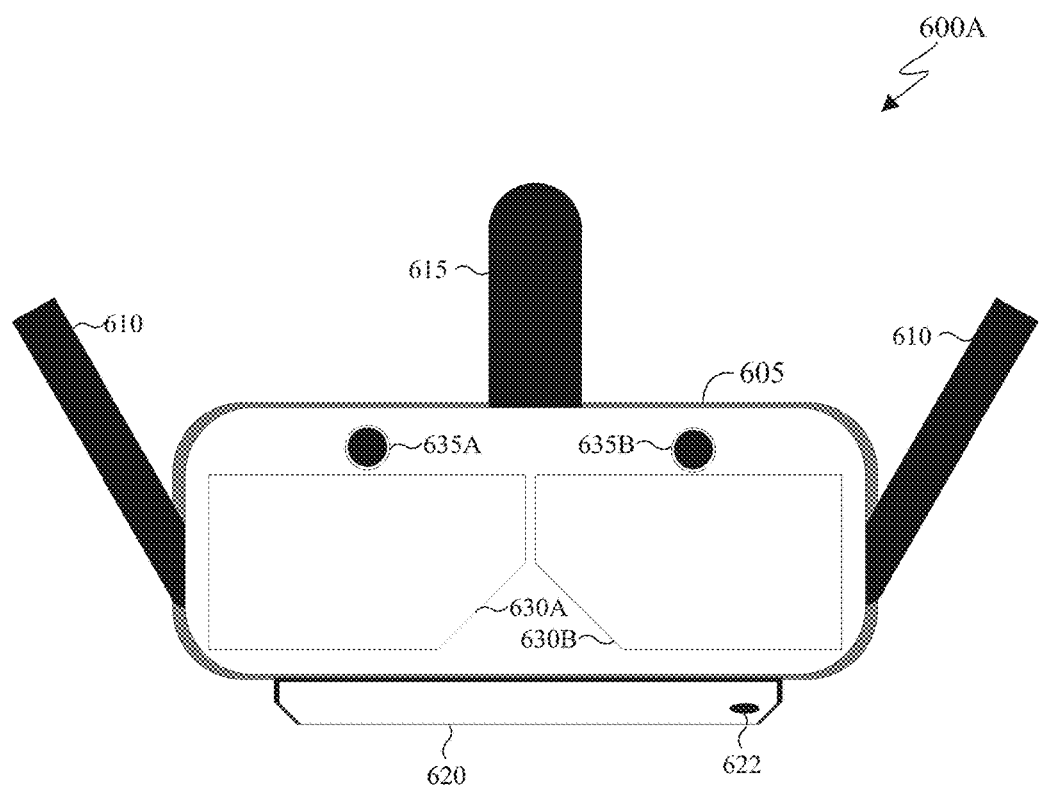
FIG. 6A illustrates an example internal view of a head mounted display, in accordance with an embodiment of this disclosure.

FIG. 6A illustrates an example internal view of a head mounted display in accordance with an embodiment of this disclosure. FIG. 6A illustrates an internal view of the head mounted display 405 of FIG. 4A. The head mounted display 405, the head straps 410 and 510, head strap 415 and 515, lip tracking sensor 420, and microphone 422 as illustrated in FIGS. 4A and 5A are the same as or similar to the head mounted display 605, the head straps 610, head strap 615, lip tracking sensor 620, and microphone 622, as illustrated in FIG. 6A. Descriptions associated with the head straps 610 and 615 are detailed above with reference to FIGS. 4A, 4B, 5A, and 5B. The embodiment of environment 600A shown in FIG. 6A is for illustration only. Other embodiments can be used without departing from the scope of the present disclosure.

FIG. 6A illustrates an embodiment illustrating a head mounted display 605 can be configured similar to any of the one or more client devices 106-114 of FIG. 1, include internal components similar to that of electronic device 200 of FIG. 2 and head mounted display 310 of FIG. 3. In certain embodiments, the head mounted display 605 is also configured to include control unit 320 of FIG. 3. Head mounted display 605 includes head straps 610 and 615 and lip tracking sensor 620 focused downward towards a mouth of the user, a microphone 422, displays 630A and 630B, and eye cameras 635A and 635B.

Lip tracking sensor 620 is affixed to the head mounted display 605 and positioned to capture various movements of the user's lips. Lip tracking sensor 620 is configured similar to lip movement detector 270 of FIG. 2 and can include mouth camera 314 of FIG. 3. In certain embodiments, the lip tracking sensor 620 is an image sensor capable to tracking lip movement. Based on the lip movement, context analyzer 328 of FIG. 3 is able to more accurately understand a command given by the user. For example, lip tracking sensor 620 captures lip movement of the user to allow context analyzer 328 of FIG. 3 to recognize words formed by the movement of the lips and mouth of the user. In certain embodiments, the lip tracking sensor 620 understands speech based on interpreting the e movements of the lips, face and tongue of the user.

Microphone 622 is similar to microphone 220 of FIG. 2, and microphone 318 of FIG. 3. Even though, environment 600A illustrates microphone 622 affixed to lip tracking sensor 620, microphone 622 can be affixed at any location and associated with head mounted display 605 to capture spoken words from the user.

Displays 630A and 630B illustrates an example stereoscopic user interface. Display 630A illustrates a display screen designated for the left eye of the user. Display 630A is an inward facing display located within the head mounted display 605. Display 630A is configured similar to display 255 of FIG. 2. and display 312 of FIG. 3. Display 630A can be any size and shape within head mounted display 605. Display 630A is capable of displaying images, videos, text, a user interface, such as selectable icons, or a combination thereof. In certain embodiments, the display 630A is transparent allowing a user to see through the display and provides augmented reality superimposed over the user's vision. In certain embodiments, the display 630A can be curved provider a larger field of view and perspective for the user.

Display 630B is similar to display 630A. Display 630B illustrates a display screen designated for the right eye of the user. Display 630B is an inward facing display located within the head mounted display 605. Display 630B is configured similar to display 255 of FIG. 2 and display 312 of FIG. 3. Display 630B can be any size and shape within head mounted display 605. Display 630B is capable of displaying images, videos, text, a user interface, such as selectable icons, or a combination thereof. In certain embodiments, the display 630B is transparent allowing a user to see through the display and provides augmented reality superimposed over the user's vision. In certain embodiments, the display 630B can be curved provider a larger field of view and perspective for the user.

In certain embodiments, the display 630A and display 630B are a single display. In certain embodiments, the display 630A and the display 630B are stereoscopic displays. In certain embodiments, the display 630A and the display 630B each display different content. For example, by displaying different images, the user can experience depth perception when viewing both images simultaneously.

Eye camera 635A illustrates a camera configured to capture the eye of the user designated for the left eye of the user and associated with the display 630A. Eye camera 635A is associated with the eye focus detector 275 of FIG. 2 and eye camera 316 of FIG. 3. Eye camera 635A is capable of capturing the movement of an eye of the user. In certain embodiments, the eye camera 635A emits an IR or near-infrared light source to capture the movement of the eye of the user as the eye focuses on the content displayed on the display 630A, within the head mounted display 605. Based on the captured movement of the eye, the focus detector 275 of FIG. 2 or eye focus processor 324 of FIG. 3 or both are able to derive an area on the display 630A that the eye is focused on, as well as identify and determine the object(s) the eye is focused upon based on the content displayed on the display 630A. For example, the eye camera 635A captures the location of the eye with respect to the display 630A, and eye focus processor 324 determines the object(s) the eye is focused upon based on the content displayed on the display 630A.

Eye camera 635B is similar to eye camera 635A. Eye camera 635B illustrates a camera configured to capture the eye of the user designated for the right eye of the user and associated with display 630B. Eye camera 635B is associated with the eye focus detector 275 of FIG. 2 and eye camera 316 of FIG. 3. Eye camera 635B is capable of capturing the movement of an eye of the user. In certain embodiments, the eye camera 635B emits an IR or near-infrared light source to capture the movement of the eye of the user as the eye focuses on the content displayed on the display 630B, within the head mounted display 605. Based on the captured eye movement, the eye focus detector 275 of FIG. 2 or eye focus processor 324 of FIG. 3 or both are able to derive an area on the display 630B that the eye is focused on, and determine the object(s) the eye is focused upon based on the content displayed on the display 630B. For example, the eye camera 635B captures the location of the eye with respect to the display 630B, and eye focus processor 324 determines the object(s) the eye is focused upon based on the content displayed on the display 630B.

In certain embodiments, eye camera 635A and eye camera 635B can be a single camera. For example, a single eye camera can be capable to capture and track the eye movement of both eyes, simultaneously. In certain embodiments, eye camera 635A or eye camera 635B is omitted, as only one eye is tracked.

Figure 6B:
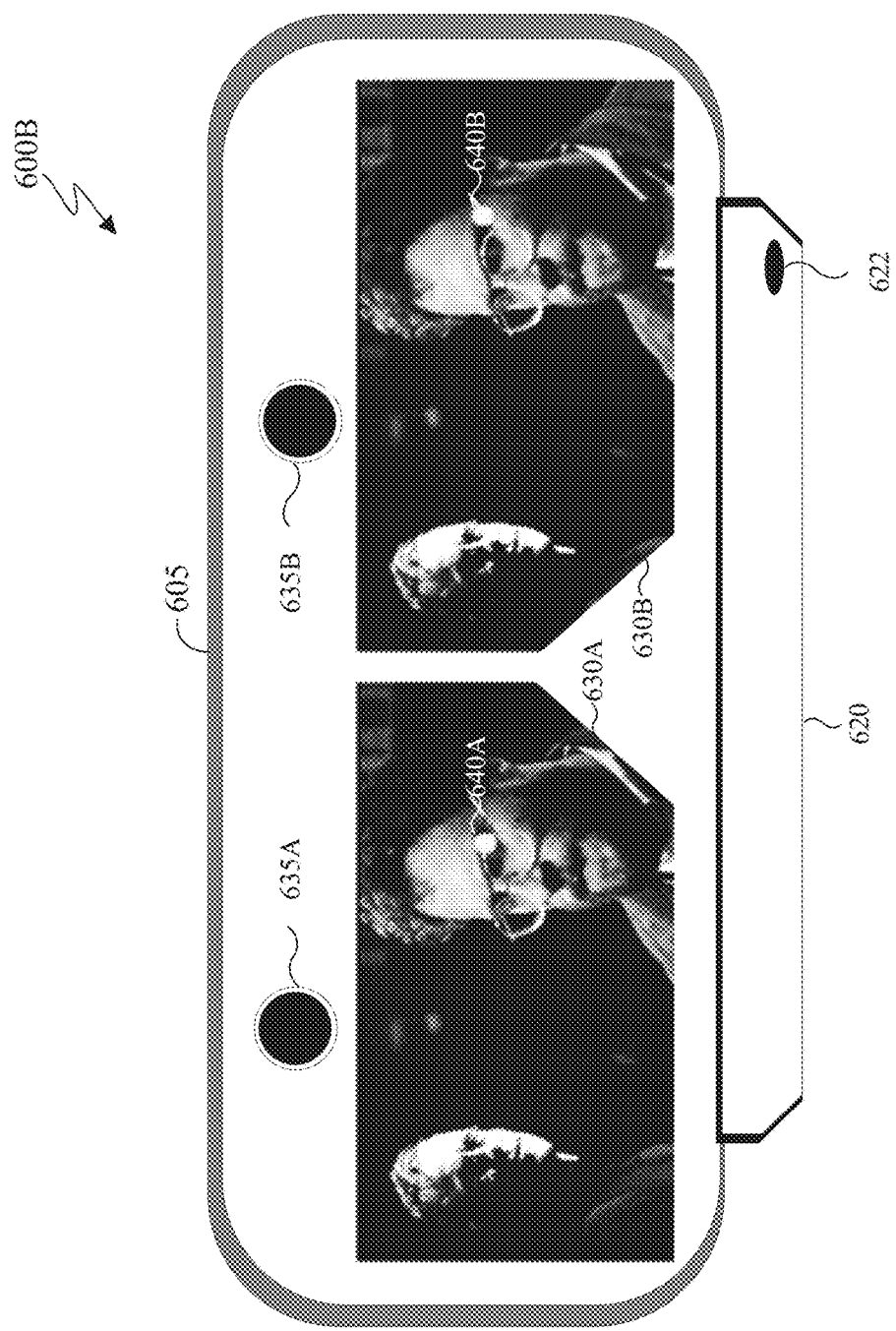
FIG. 6B illustrates an example implementation eye focus detection, in accordance with an embodiment of this disclosure.

FIG. 6B illustrates an example implementation eye focus detection in accordance with an embodiment of this disclosure. FIG. 6B illustrates the head mounted display 605 of FIG. 6A implementing an eye focus detection. The embodiment depicted in environment 600B shown in FIG. 6B is for illustration only. Other embodiments can be used without departing from the scope of the present disclosure.

Eye camera 635A derives an area of the user's eye focus as location 640A, on the display 630A. Location 640A moves based on the focus of the user. As illustrated in environment 600B, the user's eye focus is on the eye of the person displayed on the display 630A. In certain embodiments, the location 640A is continually displayed on display 630A as the user's eye focus changes. In certain embodiments, the location 640A does not appear on the user interface. Location 640A can be utilized by eye focus processor 324 and context analyzer 328 of FIG. 3 to derive context from one or more commands from a user. For example, if the user commands "tell me the name of this actor," the phrase 'this actor' lacks context and the system is then unable to provide a response. By incorporating the eye focus of the user, context analyzer 328 can interpret the generic term "this actor" as location 640A. Context analyzer 328 can derive the content displayed on the display 630A, and the object the user is looking at, such as location 640A. Context analyzer 328 can then extract a portion of the display including location 640A, perform facial recognition, an internet search, or the like, to identify the actor. Context analyzer 328 can then identify the actor of the eye focus at location 640A and provide a response to the user.

Similarly, eye camera 635B derives an area of the eye focus as location 640B, on the display 630B. Location 640B moves based on the focus of the user. As illustrated in environment 600B, the eye focus of the user is near the eye of the person displayed on the display 630B. In certain embodiments, the location 640B is continually displayed on display 630B as the user's eye focus moves throughout the display 630B. In certain embodiments, the location 640B does not appear on the display 630B. In certain embodiments, the location 640A is displayed on the display 630A while display 630B does not display the eye focus of the user, and vice-versa. Location 640B can be utilized by eye focus processor 324, and context analyzer 328 of FIG. 3 to derive context from one or more commands from a user. For example, if the user commands, "tell me the name of this actor," context analyzer 328 can interpret the generic term "this actor" as location 640B, the user's eye focus. Context analyzer 328 can then identify the actor of the eye focus at location 640A and 640B and provide a response to the user. Location 640A and 640B do not need to match the same location on the display 630A and 630B, respectively.

Figure 7:
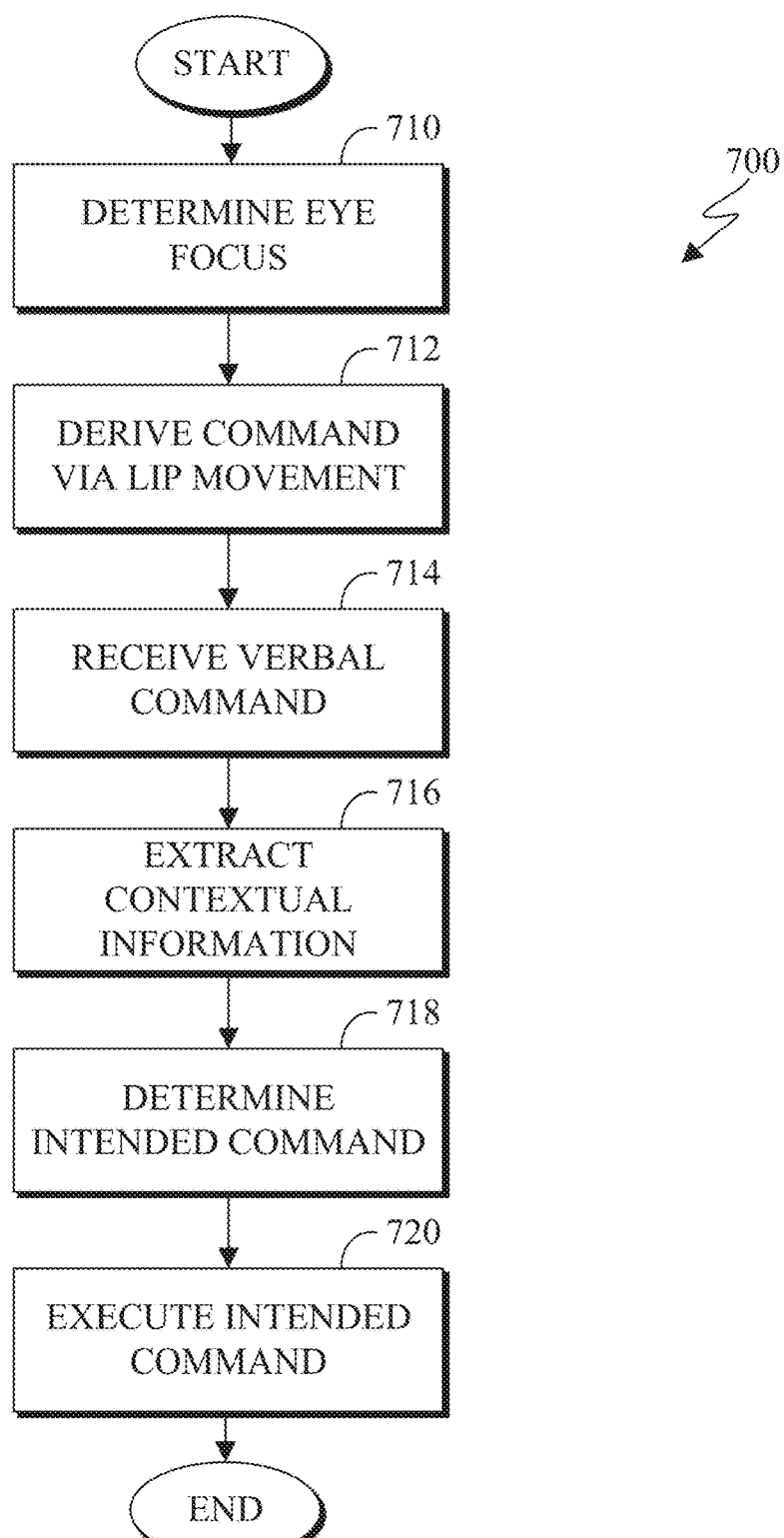
FIG. 7 illustrates an example method determining an operation to perform based on contextual information, in accordance with an embodiment of this disclosure.

FIG. 7 illustrates an example method determining an operation to perform based on contextual information, in accordance with an embodiment of this disclosure. While process 700 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the method of determining an operation to perform based on contextual information is described with respect to the electronic device 200 of FIG. 2 and environment architecture 300 of FIG. 3. However, the process 700 can be used with any other suitable system.

In block 710, context analyzer 328 determines the object of an eye focus. In certain embodiments, context analyzer 328 identifies individual objects displayed on a display. In certain embodiments, context analyzer 328 determines an eye position in relation to the display. Thereafter, context analyzer 328 can identify the object of the eye focus.

In certain embodiments, the eye focus can be tracked and maintained in an information repository. For example, if the object of the eye focus moves on the display or leaves the display entirely, context analyzer 328 can incorporate the object in a later analysis when extracting contextual information. For example, if the user is watching a movie and car drives in and out of the display, the user can assert a command inquiring as to the type of car that was just displayed. Thereafter, context analyzer 328 can utilize the tracked eye focus to determine that the question is directed towards the object that is no longer displayed, and still provide a response.

In block 712, context analyzer 328 derives a command based on lip movements of the user. In certain embodiments, the context analyzer 328 extracts a command based on analyzing a pattern of lip movements. For example, the mouth of the user moves in a particular method when forming a particular word. Therefore, context analyzer 328 can derive the word spoken by the user by analyzing the movements of the user's lips, tongue, mouth, facial movements (such as vibrations), or a combination thereof.

In block 714, context analyzer 328 receives a verbal command. In certain embodiments, the verbal command can be received by a natural language processing to interpret the user's command. Through natural language processing, context analyzer 328 can understand the command received from the user. In certain embodiments, context analyzer 328 can perform voice recognition processing on the received verbal command, in order to confirm the identity of the speaker. For example, if the command does not match the user identifying biometrics, context analyzer 328 can ignore the command.

In block 716, context analyzer 328 extracts contextual information from the object associated with the eye focus of the user, the received verbal command, the derived command, or a combination thereof. In certain embodiments, context analyzer 328 analyzes the received inputs to extract information that can provide context to a given command. Context analyzer 328 can maintain a log of objects of the eye focus, in relation to a given command.

In block 718, context analyzer 328 determines the intended command. For example, if the user provides a command with a generic term, such as "open this," "who is that," "zoom in here," context analyzer 328 can associate the object of the eye focus with the generic term to determine the intended command. For another example, if context analyzer 328 fails to understand the verbal command, then context analyzer 328 can substitute the derived command for the verbal command. For another example, if the context analyzer 328 receives an ambiguous command such as if the user is lip singing or in a conversation with another, context analyzer 328 can determine that no command is intended.

In block 720, context analyzer 328 executes the intended command. For example, the context analyzer 328 can look up a question the user asked. For another example, the context analyzer 328 can perform the function requested by the user. Alternatively, if the context analyzer 328 determines that no command was intended, then context analyzer 328 performs no action. In certain embodiments, context analyzer 328 notifies another device or system to execute the intended function. For example, context analyzer 328 can direct a web browser to search for a particular item.

Although the figures illustrate different examples of user equipment, various changes can be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A multi-input method for controlling a head mounted display, the method comprising:
   displaying, on a display of the head mounted display, content including an object;
   tracking a position of an eye focus in relation to a position on the display;
   maintaining a log of the position of the eye focus in relation to the display, and the content in proximity to the position of the eye focus on the display;
   determining an area of the eye focus on the display, and associating the area of the eye focus with the object;
   receiving a verbal command;
   deriving a command based on a detected set of lip movements;
   extracting contextual information from at least one of the object associated with the eye focus, the received verbal command, or the derived command;
   determining an intended command, based on the extracted contextual information and at least one of the verbal command or the derived command; and
   performing the determined intended command.

2. The method of claim 1, further comprising:
   in response to receiving a command determining the content displayed on the display associated with the eye focus, has changed, wherein the command is at least one of the verbal command or the derived command; and
   searching the log of the tracked position of the eye focus, to discover the object that is associated with the received command, to extract the contextual information associated with the object that is associated with the received command.

3. The method of claim 1, further comprising:
   determining whether at least one of the verbal command or the derived command includes a generic term;

when at least one of the verbal command or the derived command includes the generic term, identifying at least one displayed object, associated with the eye focus in proximity to a time when at least one of the verbal command is received or the set of lip movements is detected;

determining whether the generic term is related to the identified at least one displayed object;

determining the intended command based on the extracted contextual information of the eye focus and at least one of the verbal command or the derived command, when the verbal command and the derived command are above a similarity threshold and the generic term is determined to be related to the identified at least one displayed object;

determining the intended command based on the extracted contextual information of the eye focus and the verbal command, when the generic term included in the verbal command is determined to be related to the identified at least one displayed object; and determining the intended command based on the extracted contextual information of the eye focus and the derived command, when the generic term included in the derived command is determined to be related to the identified at least one displayed object.

4. The method of claim 1, wherein determining a requested operation comprises:
identifying an ambiguous term of either the verbal command or the derived command; and
replacing the identified ambiguous term with the extracted contextual information from the object associated with the eye focus.

5. The method of claim 1, further comprising:
when the verbal command and the derived command are below a similarity threshold, identifying the intended command based on an executable command included in either the verbal command or the derived command;
when either the verbal command or the derived command do not include the executable command, identifying a portion of at least one of the verbal command or the derived command that is ambiguous;
determining one or more replacement commands to clarify the portion of the verbal command or the derived command that is identified as ambiguous;
displaying the one or more replacement commands on the display;
identifying an additional eye focus on a replacement command of the one or more replacement commands, the additional eye focus on the replacement command indicating the replacement command is to replace the portion of the verbal command or the derived command that is ambiguous; and
replacing the portion of the verbal command or the derived command that is ambiguous with the replacement command based on the additional eye focus, to derive the intended command.

6. The method of claim 1, wherein:
the received verbal command is inaudible, wherein
determining the intended command is based on the extracted contextual information from the object associated with the eye focus and the derived command.

7. A electronic device comprising:
a display;
a communication interface;
a memory; and
at least one processor coupled to the display, communication interface, and the memory, the at least one processor is configured to:
display on the display, content including an object;
track a position of an eye focus in relation to a position on the display;
maintain a log of the position of the eye focus in relation to the display, and the content in proximity to the position of the eye focus on the display;
determine an area of the eye focus on the display, and associating the area of the eye focus with the object;
receive a verbal command;
derive a command based on a detected set of lip movements;
extract contextual information from at least one of the object associated with the eye focus, the received verbal command, or the derived command;
determine an intended command, based on the extracted contextual information and at least one of the verbal command or the derived command; and
perform the determined intended command.

8. The electronic device of claim 7, wherein the at least one processor is further configured to:
in response to receiving a command, determine the content displayed on the display associated with the eye focus, has changed, wherein the command is at least one of the verbal command or the derived command; and
search the log of the tracked position of the eye focus, to discover the object that is associated with the received command, to extract the contextual information associated with the object that is associated with the received command.

9. The electronic device of claim 7, wherein the at least one processor is further configured to:
determine whether at least one of the verbal command or the derived command includes a generic term;
when at least one of the verbal command or the derived command includes the generic term, identify at least one displayed object, associated with the eye focus in proximity to a time when at least one of the verbal command is received or the set of lip movements is detected;
determine whether the generic term is related to the identified at least one displayed object;
determine the intended command based on the extracted contextual information of the eye focus and at least one of the verbal command or the derived command, when the verbal command and the derived command are above a similarity threshold and the generic term is determined to be related to the identified at least one displayed object;
determine the intended command based on the extracted contextual information of the eye focus and the verbal command, when the generic term included in the verbal command is determined to be related to the identified at least one displayed object; and
determine the intended command based on the extracted contextual information of the eye focus and the derived command, when the generic term included in the derived command is determined to be related to the identified at least one displayed object.

10. The electronic device of claim 7, wherein the at least one processor is further configured to:
identify an ambiguous term of either the verbal command or the derived command; and replace the identified ambiguous term with the extracted contextual information from the object associated with the eye focus.

11. The electronic device of claim 7, wherein the at least one processor is further configured to:
when the verbal command and the derived command are below a similarity threshold, identify the intended command based on an executable command included in either the verbal command or the derived command;
when either the verbal command or the derived command do not include the executable command, identify a portion of at least one of the verbal command or the derived command that is ambiguous;
determine one or more replacement commands to clarify the portion of the verbal command or the derived command that is identified as ambiguous;
display the one or more replacement commands on the display;
identify an additional eye focus on a replacement command of the one or more replacement commands, the additional eye focus on the replacement command indicating the replacement command is to replace the portion of the verbal command or the derived command that is ambiguous; and
replace the portion of the verbal command or the derived command that is ambiguous with the replacement command based on the additional eye focus, to derive the intended command.

12. The electronic device of claim 7, wherein:
the received verbal command is inaudible, and
the at least one processor is further configured to determine the intended command based on the extracted contextual information from the object associated with the eye focus and the derived command.

13. A non-transitory computer readable medium embodying a computer program, the computer program comprising program code that when executed by at least one processor of an electronic device causes at least one processing device to:
display on a display, content including an object;
track a position of an eye focus in relation to a position on the display;
maintain a log of the position of the eye focus in relation to the display, and the content in proximity to the position of the eye focus on the display;
determine an area of the eye focus on the display, and associating the area of the eye focus with the object;
receive a verbal command;
derive a command based on a detected set of lip movements;
extract contextual information from at least one of the object associated with the eye focus, the received verbal command, or the derived command;
determine an intended command, based on the extracted contextual information and at least one of the verbal command or the derived command; and
perform the determined intended command.

14. The non-transitory computer readable medium of claim 13, where the program code that when executed further causes the at least one processor to:
in response to receiving a command, determine the content displayed on the display associated with the eye focus, has changed, wherein the command is at least one of the verbal command or the derived command; and
search the log of the tracked position of the eye focus, to discover the object that is associated with the received command, to extract the contextual information associated with the object that is associated with the received command.

15. The non-transitory computer readable medium of claim 13, wherein the program code that when executed further causes the at least one processor to:
determine whether at least one of the verbal command or the derived command includes a generic term;
when at least one of the verbal command or the derived command includes the generic term, identify at least one displayed object, associated with the eye focus in proximity to a time when at least one of the verbal command is received or the set of lip movements is detected;
determine whether the generic term is related to the identified at least one displayed object;
determine the intended command based on the extracted contextual information of the eye focus and at least one of the verbal command or the derived command, when the verbal command and the derived command are above a similarity threshold and the generic term is determined to be related to the identified at least one displayed object;
determine the intended command based on the extracted contextual information of the eye focus and the verbal command, when the generic term included in the verbal command is determined to be related to the identified at least one displayed object; and
determine the intended command based on the extracted contextual information of the eye focus and the derived command, when the generic term included in the derived command is determined to be related to the identified at least one displayed object.

16. The non-transitory computer readable medium of claim 13, wherein the program code that when executed further causes the at least one processor to:
identify an ambiguous term of either the verbal command or the derived command; and
replace the identified ambiguous term with the extracted contextual information from the object associated with the eye focus.

17. The non-transitory computer readable medium of claim 13, wherein the program code that when executed further causes the at least one processor to:
when the verbal command and the derived command are below a similarity threshold, identify the intended command based on an executable command included in either the verbal command or the derived command;
when either the verbal command or the derived command do not include the executable command, identify a portion of at least one of the verbal command or the derived command that is ambiguous;
determine one or more replacement commands to clarify the portion of the verbal command or the derived command that is identified as ambiguous;
display the one or more replacement commands on the display;
identify an additional eye focus on a replacement command of the one or more replacement commands, the additional eye focus on the replacement command indicating the replacement command is to replace the portion of the verbal command or the derived command that is ambiguous; and
replace the portion of the verbal command or the derived command that is ambiguous with the replacement command based on the additional eye focus, to derive the intended command.

18. The method of claim 1 further comprising:
   determining the intended command, when the verbal command and the derived command are above a similarity threshold indicating the verbal command and the derived command represent similar commands.

19. The electronic device of claim 7, wherein the at least one processor is further configured to:
   determine the intended command, when the verbal command and the derived command are above a similarity threshold indicating the verbal command and the derived command represent similar commands.

20. The non-transitory computer readable medium of claim 13, where the program code that when executed further causes the at least one processor to:
   determine the intended command, when the verbal command and the derived command are above a similarity threshold indicating the verbal command and the derived command represent similar commands.

* * * * *